United States Patent
Huang et al.

(10) Patent No.: US 10,827,487 B2
(45) Date of Patent: Nov. 3, 2020

(54) METHOD AND APPARATUS FOR MONITORING FOR INTERRUPTED TRANSMISSION INDICATION IN A WIRELESS COMMUNICATION SYSTEM

(71) Applicant: ASUSTek Computer Inc., Taipei (TW)

(72) Inventors: Chun-Wei Huang, Taipei (TW); Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 37 days.

(21) Appl. No.: 16/104,814

(22) Filed: Aug. 17, 2018

(65) Prior Publication Data

US 2019/0246395 A1    Aug. 8, 2019

Related U.S. Application Data

(60) Provisional application No. 62/627,293, filed on Feb. 7, 2018.

(51) Int. Cl.
*H04W 72/04* (2009.01)
*H04L 5/00* (2006.01)
*H04W 72/12* (2009.01)

(52) U.S. Cl.
CPC ....... *H04W 72/0446* (2013.01); *H04L 5/0003* (2013.01); *H04L 5/0032* (2013.01); *H04W 72/042* (2013.01); *H04W 72/12* (2013.01)

(58) Field of Classification Search
CPC ............ H04W 72/0446; H04W 72/042; H04L 5/0003
USPC ................ 455/436, 442, 432.1, 435.1, 422.1
See application file for complete search history.

(56) References Cited

U.S. PATENT DOCUMENTS

| 2016/0205664 | A1  | 7/2016  | Zhang |
| 2016/0234857 | A1* | 8/2016  | Chen ................. H04W 72/1231 |
| 2017/0374562 | A1  | 12/2017 | Jeon |

(Continued)

FOREIGN PATENT DOCUMENTS

WO    2018031623    2/2018

OTHER PUBLICATIONS

VIVO: "Multiplexing data with different transmission durations", 3GPP Draft; R1-1800205_Multiplexing Data With Different Transmission Durations, 3rd Generation Partnership Project (3GPP), Mobile Competence Centre ; 650, Route Des Lucioles ; F-06921 Sophia-Antipolis vol. RAN WG1, No. Vancouver, Canada; Jan. 22, 2018-Jan. 26, 2018 Jan. 13, 2018 (Jan. 13, 2018), XP051384694.

(Continued)

*Primary Examiner* — Nghi H Ly
(74) *Attorney, Agent, or Firm* — Blue Capital Law Firm, P.C.

(57) ABSTRACT

A method and apparatus are disclosed from the perspective of a UE (User Equipment) and/or a base station. In one embodiment, the method includes the base station configuring the UE with a first serving cell and a second serving cell. The method also includes the base station configuring the UE with a periodicity for monitoring a downlink control signal in the first serving cell, wherein the base station is not allowed to configure the UE such that the periodicity includes a non-integer number of symbol(s) of the second serving cell, and wherein the downlink control signal includes a pre-emption indication (PI) for the second serving cell.

24 Claims, 17 Drawing Sheets

(56) References Cited

U.S. PATENT DOCUMENTS

2018/0035459 A1  2/2018  Islam

OTHER PUBLICATIONS

Inter Corporation: "Remaining details on multiplexing data with different duration", 3GPP Draft; R1-1800336 Intel-Preemption, 3rd Generation Partnership Project (3GPP), Mobile Competence Centre ; 650, Route Des Lucioles ; F-06921 Sophia-Antipolis Cedex ;France vol. RAN WG1, No. Vancouver, Canada; Jan. 22, 2018-Jan. 26, 2018 Jan. 13, 2018 (Jan. 13, 2018).

Extended European Search Report from corresponding EP Application No. 18189444.5, dated Oct. 29, 2018.

3GPP TSG RAN WG1 Meeting #91 R1-1721452 Reno, USA, Nov. 27-Dec. 1, 2017.

3GPP TSG RAN WG1 Meeting 90bis R1-1717043 Prague, CZ, Oct. 9-13, 2017.

Office Action from Taiwan Intellectual Property Office in corresponding TW Application No. 107128890, dated Apr. 17, 2019.

3GPP TSG-RAN WG1 Meeting AH 1801, R1-1801155, Vancouver, Canada, Jan. 22-26, 2018 agenda item: 7.3.3.6, source: vivo, title: summary of 7.3.3.6 multiplexing data with different transmission duration document for: discussion and decision.

Office Action from Japan Patent Office in corresponding JP Application No. 2018-153369, dated Jun. 25, 2019.

Vivo, R1-1800205, Multiplexing data with different transmission durations, 3GPP TSG RAN WG1 #Ah, 3GPP server publication date (Jan. 13, 2018).

LG Electronics, R1-1800383, Remaining issues on pre-emption indication, 3GPP TSG RAN WG1 #AH, 3GPP server publication date (Jan. 13, 2018).

Intel Corporation, R1-1800336, Remaining details on multiplexing data with different durations, 3GPP TSG RAN WG1 #AH, server publication date (Jan. 13, 2018) End.

Office Action from Korean Intellectual Property Office in corresponding KR Application No. 10-2018-0096050, dated Nov. 14, 2019.

* cited by examiner

| $\mu$ | $\Delta f = 2^{\mu} \cdot 15 \, [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

FIG. 7 (PRIOR ART)

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 8 (PRIOR ART)

| Aggregation level | Number of CCEs |
|---|---|
| 1 | 1 |
| 2 | 2 |
| 4 | 4 |
| 8 | 8 |
| 16 | 16 |

FIG. 9 (PRIOR ART)

| CCE Aggregation Level | Number of Candidates |
|---|---|
| 4 | 4 |
| 8 | 2 |
| 16 | X |

FIG. 10 (PRIOR ART)

METHOD AND APPARATUS FOR MONITORING FOR INTERRUPTED TRANSMISSION INDICATION IN A WIRELESS COMMUNICATION SYSTEM

CROSS-REFERENCE TO RELATED APPLICATIONS

The present Application claims the benefit of U.S. Provisional Patent Application Ser. No. 62/627,293 filed on Feb. 7, 2018, the entire disclosure of which is incorporated herein in its entirety by reference.

FIELD

This disclosure generally relates to wireless communication networks, and more particularly, to a method and apparatus for improving scheduling in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment) and/or a base station. In one embodiment, the method includes the base station configuring the UE with a first serving cell and a second serving cell. The method also includes the base station configuring the UE with a periodicity for monitoring a downlink control signal in the first serving cell, wherein the base station is not allowed to configure the UE such that the periodicity includes a non-integer number of symbol(s) of the second serving cell, and wherein the downlink control signal includes a pre-emption indication (PI) for the second serving cell.

BRIEF DESCRIPTION OF THE DRAWINGS

FIG. 7 is a reproduction of Table 4.3.2-1 of 3GPP R1-1721341.

FIG. 8 is a reproduction of Table 4.3.2-2 of 3GPP R1-1721341.

FIG. 9 is a reproduction of Table 7.3.2.1-1 of 3GPP R1-1721341.

FIG. 10 is a reproduction of Table 10.1-1 of 3GPP R1-1721343.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: Final Report of 3GPP TSG RAN WG1 #AH_NR2 v1.0.0 (Qingdao, China, 27th-30th Jun. 2017); Final Chairman's Note of 3GPP TSG RAN WG1 Meeting #90 (Prague, Czech Republic, 21st 25th August 2017); Final Chairman's Note of 3GPP TSG RAN WG1 Meeting #AH_NR3 (Nagoya, Japan, 18st 21th Sep. 2017); Final Chairman's Note of 3GPP TSG RAN WG1 Meeting #90bis (Prague, CZ, 9th-13th, October 2017) (updated with email approvals); Final Chairman's Note of 3GPP TSG RAN WG1 Meeting #91 (Reno, USA, 27$^{th}$ November-1$^{st}$ Dec. 2017); R1-1721341, "NR; Physical channels and modulation (Release 15)"; R1-1721342, "NR; Multiplexing and channel coding (Release 15)"; R1-1721343, "NR; Physical layer procedures for control (Release 15)"; R1-1721344, "NR; Physical layer procedures for data (Release 15)"; and R1-1801155, "Summary of 7.3.3.6 multiplexing data with different transmission durations". The standards and documents listed above are hereby expressly incorporated by reference in their entirety.

Figure 1:
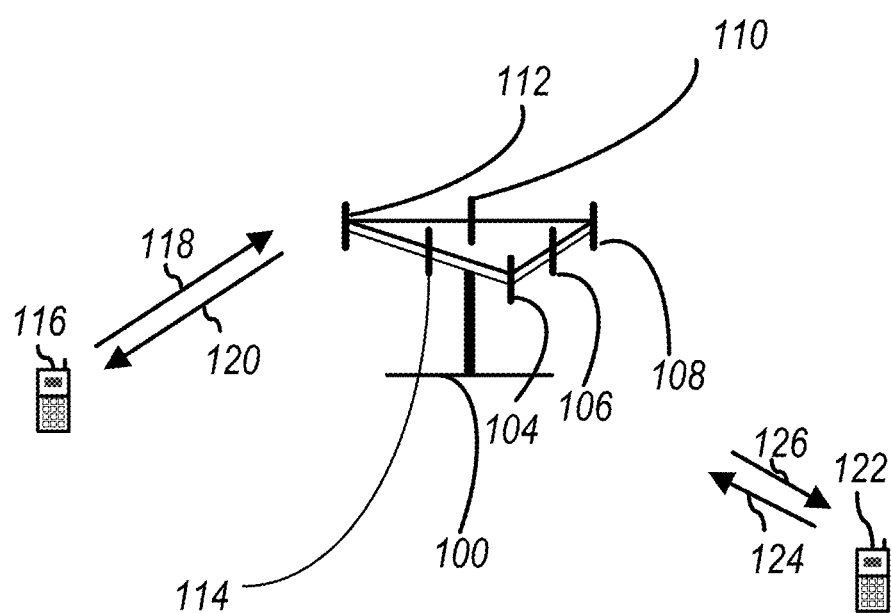
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
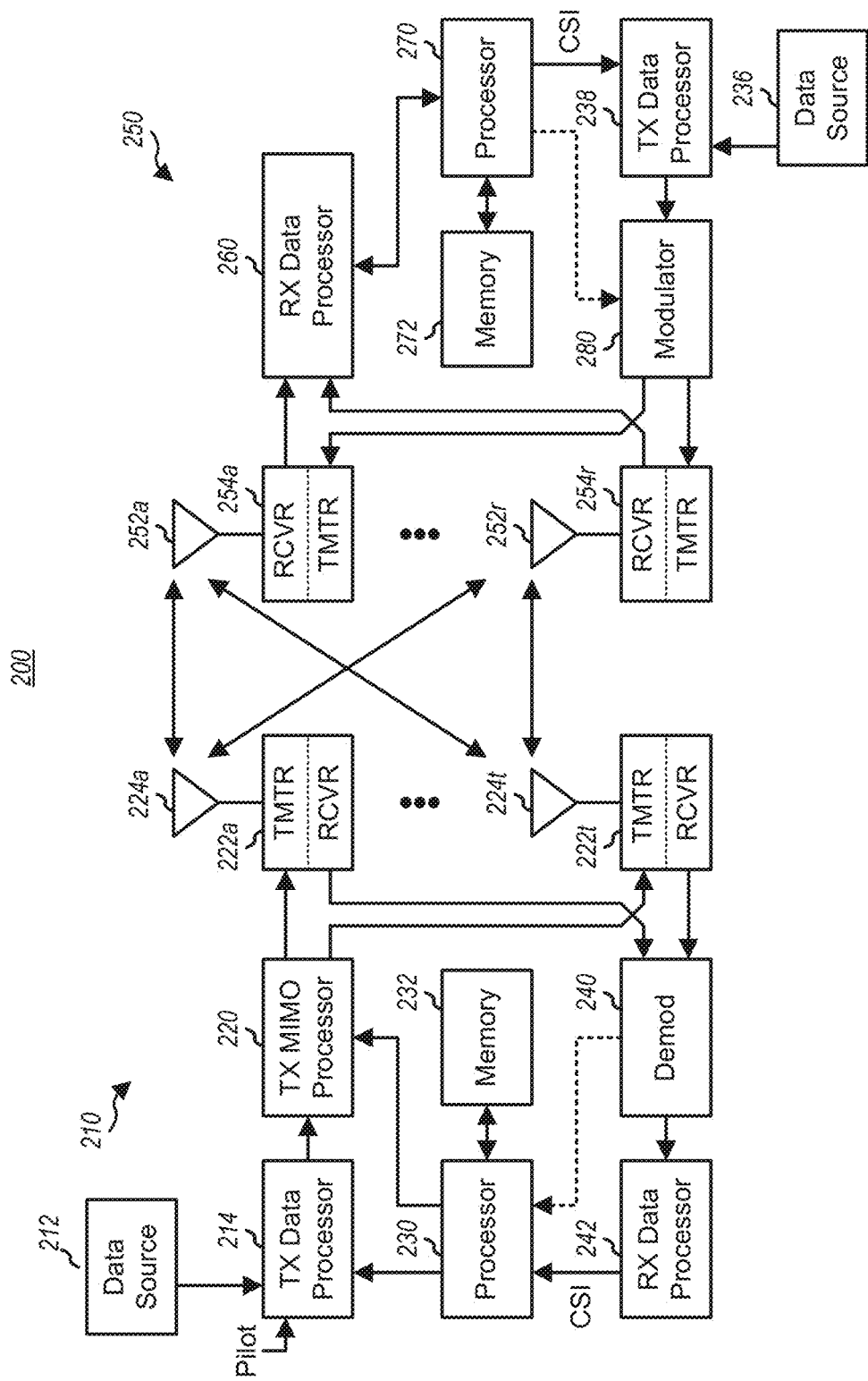
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
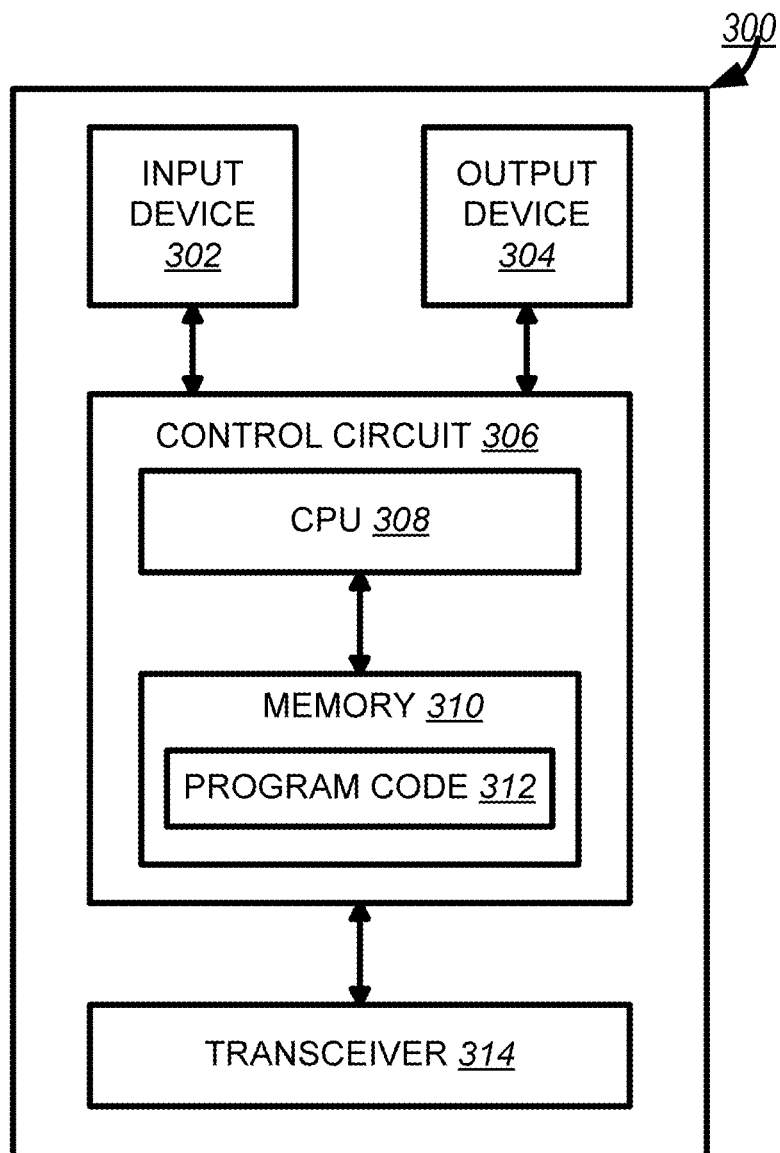
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
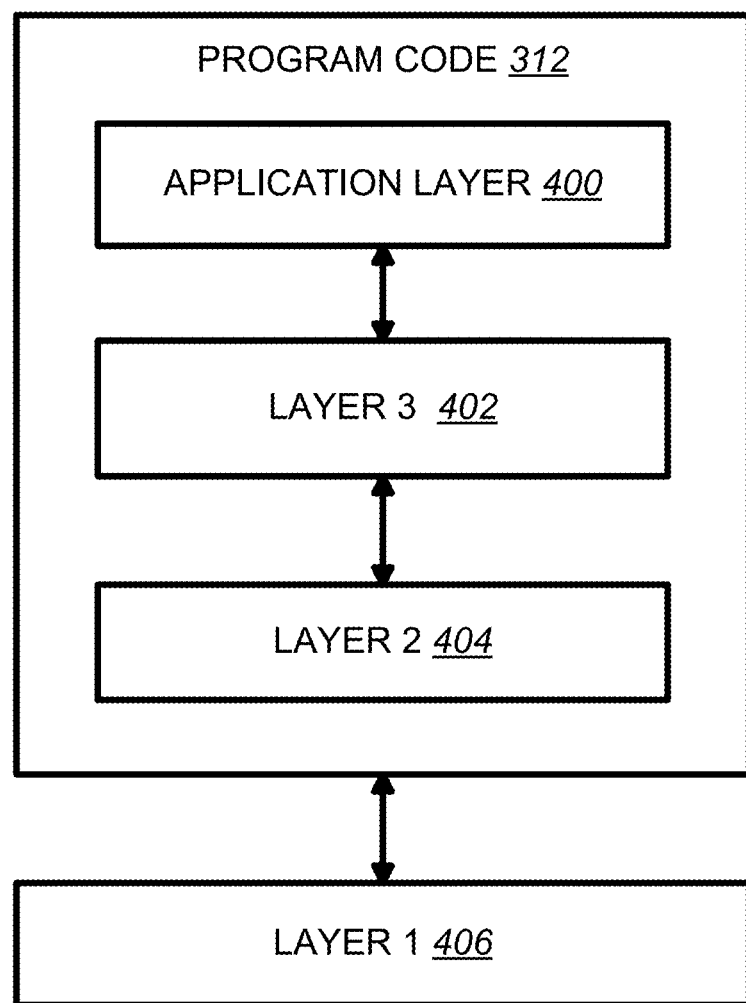
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In general, group common DCI (Downlink Control Information) is used for carrying Preemption Indication (PI). The Final Report of 3GPP TSG RAN WG1 #AH_NR2 captures the following agreement:
Agreements:
    For downlink preemption indication
        It is transmitted using a group common DCI in PDCCH
            FFS: This group common DCI is transmitted separately from SFI
            Whether a UE needs to monitor preemption indication is configured by RRC signaling
            The granularity of preemption indication in time domain can be configured
            Details of granularity are FFS
In the Final Chairman's Note of 3GPP TSG RAN WG1 Meeting #90, the concept of reference downlink resource for preempted resource(s) has been agreed as follows:
Agreements:
    Preempted resource(s) within a certain time/frequency region (i.e. reference downlink resource) within the periodicity to monitor group common DCI for pre-emption indication, is indicated by the group common DCI carrying the preemption indication
        The frequency region of the reference downlink resource is configured semi-statically
            FFS: explicit signaling or implicitly derived by other RRC signalling
        The time region of the reference downlink resource is configured semi-statically
            FFS: explicit signaling or implicitly derived by other RRC signalling
        The frequency granularity of pre-emption indication is configured to be y RBs within the reference downlink resource for the given numerology
            FFS: explicit signaling or implicitly derived by other RRC signalling
            Note: The y RBs can correspond to the whole frequency region of the downlink reference resource.
        The time granularity of pre-emption indication is configured to be x symbols within the reference downlink resource for the given numerology
            FFS: explicit signaling or implicitly derived by other RRC signalling
        Note: Time/frequency granularities of pre-emption indication should take into account the payload size of the group common DCI carrying the pre-emption indication The Final Chairman's Note of 3GPP TSG RAN WG1 Meeting #AH_NR3 captures some agreements related to group common DCI carrying PI as described below, including an agreement that introduces a TCI (Transmission Configuration Indication) in a DCI for QCL (Quasi Co-Location) indication of data transmission:
R1-1716842 WF on QCL Indication for DL Physical Channels Ericsson, CATT, NTT Docomo, Samsung, Qualcomm
Agreement:
    A UE is RRC configured with a list of up to M candidate Transmission Configuration Indication (TCI) states at least for the purposes of QCL indication
        Whether M equal to or larger than $2^N$ is for further study, where N is the size of the DCI field for PDSCH
        FFS: Mapping between the candidate states to the states described by N bit DCI field for PDSCH
        Each TCI state can be configured with one RS Set
        Each ID (FFS: details of ID) of DL RS at least for the purpose of spatial QCL in an RS Set can refer to one of the following DL RS types:
            SSB
            Periodic CSI-RS
            Aperiodic CSI-RS
            Semi-persistent CSI-RS
        FFS: Other RS (e.g. TRS, PTRS) in an RS set depending on outcome of discussions in the QCL agenda item
        FFS: Mechanisms to initialize/update the ID of a DL RS(s) in the RS Set used at least for spatial QCL purposes
            At least the following two mechanisms are FFS: (1) explicit signalling to the UE of the DL RS(s) ID and corresponding TCI state (2) implicit association of the DL RS ID(s) to a TCI state based on measurements by the UE.
            The mechanisms used for different RS types are FFS
        FFS: Whether or not a TCI state includes other parameters(s), e.g., for PDSCH rate matching purposes
        FFS: Value of N, where N is at most [3] bits
    Note: More details on specification of more than one DMRS port group and more than one RS Set per TCI state is to be completed after the December release.
Agreement:
    The QCL configuration for PDCCH contains the information which provides a reference to a TCI state
        Alt 1: The QCL configuration/indication is on a per CORESET basis
            The UE applies the QCL assumption on the associated CORESET monitoring occasions. All search space(s) within the CORESET utilize the same QCL.
        Alt 2: The QCL configuration/indication is on a per search space basis
            The UE applies the QCL assumption on an associated search space. This could mean that in the case where there are multiple search spaces within a CORESET, the UE may be configured with different QCL assumptions for different search spaces.
        Note: The indication of QCL configuration is done by RRC or RRC+MAC CE (FFS: by DCI)
    Note: The above options are provided as input to the control channel agenda item discussion
R1-1716890 Summary on Beam Management Offline Qualcomm Agreement:
 For QCL indication for PDSCH:
  When TCI states are used for QCL indication, the UE receives an N-bit TCI field in DCI
   The UE assumes that the PDSCH DMRS is QCL with the DL RS(s) in the RS Set corresponding to the signaled TCI state
    FFS: whether or not a QCL type is configured, configuration details are for further study
   Whether or not the TCI field is always present in a given DL-related DCI is FFS
   FFS: Whether or not the TCI field is in the same DCI as that containing the PDSCH scheduling assignment
 FFS: Timing between when the UE receives a QCL configuration/indication and the first time that the QCL assumption may be applied for demodulation of PDSCH or PDCCH
Agreements:
 UE can be configured to monitor the group common PDCCH for SFI and the group common DCI for DL preemption indication within the same or different CORESETs
Agreements:
 As a working assumption
  The time duration of the reference downlink resource for preemption indication equals to the monitoring periodicity of the group-common DCI carrying the preemption indication
  For determination of the frequency region of the reference downlink resource for preemption indication, down select between the following options in RAN1#90bis
   Option 1: The frequency region of the reference downlink resource is configured explicitly by RRC
   Option 2: The frequency region of the reference downlink resource is implicitly derived by the active DL BWP
  NOTE: Companies are encouraged to address the issues highlighted in the offline summary T-doc R1-1716911
Agreements:
 The minimum periodicity for UE to monitor group common DCI for DL preemption indication is down-selected between
  Option 1: one slot
  Option 2: less than a slot
 The Final Chairman's Note of 3GPP TSG RAN WG1 Meeting #90bis captures some agreements as described below. One agreement describes reference downlink resources for preemption indication equals to monitoring periodicity of the group-common DCI carrying PI. In addition, slot level monitoring periodicity of PI is supported.
Agreements:
 The time duration of the reference downlink resource for pre-emption indication equals to the monitoring periodicity of the group-common DCI carrying the pre-emption indication
  In TDD, at least the semi-statically configured UL symbols are excluded from the reference downlink resource
   Note: This means the reference downlink resource only includes the DL or unknown symbols given by semi-static configuration within the semi-statically configured time duration of the reference downlink resource.
  FFS for the handling of reserved resource especially at RE level Agreements:
 For minimum monitoring periodicity of pre-emption indication:
  At least slot level monitoring periodicity of preemption indication is supported
  FFS to additionally support other cases (e.g. non-slot level monitoring)
Agreements:
 For slot level monitoring periodicity, UE is not required to monitor preemption indication for a slot in which PDSCH is not scheduled
 UE is not required to monitor preemption indication in DRX slots
 UE is not required to monitor preemption indication for the deactivated DL BWP
 Note: not necessarily all of the above bullets will have spec impacts
Agreements:
 The HARQ timeline for a PDSCH transmission is not affected by preemption indication.
Agreements:
 No concensus to introduce an explicit RRC configuration for frequency region of the reference downlink resource for pre-emption indication in Rel-15
 (working assumption) the frequency region of the reference downlink resource for pre-emption indication is the active DL BWP
Agreements:
 A fixed payload size (excluding CRC and potential reserved bits) of the group-common DCI carrying the downlink pre-emption indication (PI), in the format of a bitmap is used to indicate preempted resources within the semi-statically configured DL reference resource
  The bitmap indicates for one or more frequency domain parts (N>=1) and/or one or more time domain parts (M>=1)
   There is no RRC configuration involved in determining the frequency or time-domain parts
  The following combinations are supported and pre-defined {M, N}={14, 1}, {7, 2}
 A combination of {M,N} from this set of possible {M,N} is indicated 1 bit by RRC configuration for a UE
 As discussed in the Final Chairman's Note of 3GPP TST RAN WG1 Meeting #91, based on the quoted working assumption (discussed below), the UE can receives a DCI carrying multiple PI corresponding to configured mapping between each PI and a serving cell.
Working Assumption:
 DCI payload size for preemption indication is configurable by RRC
  FFS the interaction with DCI payload size for SFI especially in terms of RRC configuration, and potentially other DCI formats
Agreements:
 Within a PUCCH group, UE can be configured to monitor group common PDCCH for pre-emption indication for a Scell on a different serving cell
  One DCI can contain one or more pre-emption indication field(s) corresponding one or more serving cells
   Each field (14 bits bitmap) for one serving cell
   RRC configures the PI field location in the DCI format that is applied to that cell
Agreements:
 Supported periodicities for slot level preemption monitoring are
  1, 2, TBD1, TBD2 slots Agreements:
  No concensus to support mini-slot level monitoring periodicity of preemption indication in RAN1#91
Agreements:
  Confirm the following working assumption in RAN1#90bis
    The frequency region of the reference downlink resource for pre-emption indication is the active DL BWP
Agreements:
  Configuration of UE monitoring of preemption indication is per DL BWP
Agreements:
  For the bitmap indication, the time-frequency blocks of the reference DL resource determined by {M, N} ({M, N}={14, 1}, {7, 2}) are indexed in frequency first manner
    Note: The reference DL resource is partitioned with M time domain parts and N frequency domain parts.
    Note: Current TS38.213 needs to be updated according to the above agreement.
Agreements:
  When a PI is detected, the time location of the corresponding reference DL resource (RDR) is determined by:
    The RDR starts at the 1$^{st}$ symbol of the previous CORESET for PI monitoring and ends right before the current CORESET at which the PI is detected.
Agreements:
  The UE is not expected to take into account a PI detected in a BWP for a PDSCH scheduled in a different BWP of the same serving cell.

Figures 5, 6:
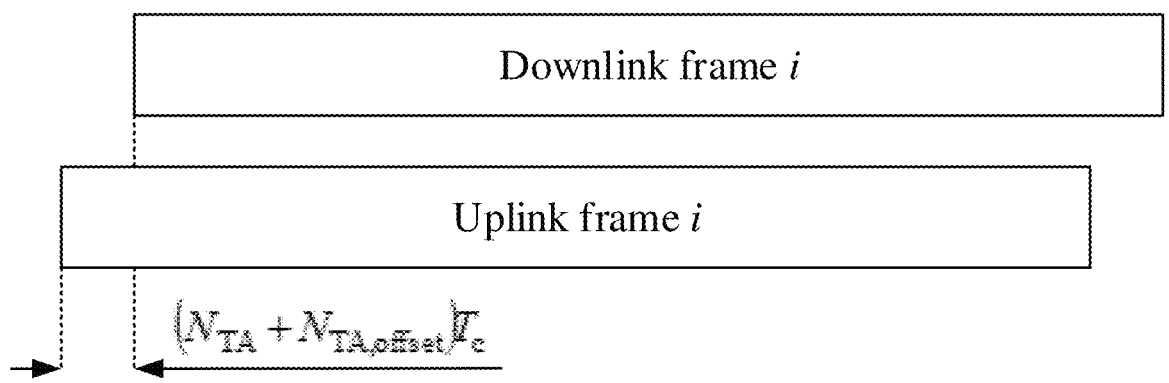
FIG. 5 is a reproduction of Table 4.2-1 of 3GPP R1-1721341.
FIG. 6 is a reproduction of FIG. 4.3.1-1 of 3GPP R1-1721341.

3GPP R1-1721341 provides the following description of some configurations of PDCCH (Physical Downlink Control Channel) structure and frame structure:
4 Frame Structure and Physical Resources
4.1 General
  Throughout this specification, unless otherwise noted, the size of various fields in the time domain is expressed as a number of time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.
4.2 Numerologies
  Multiple OFDM numerologies are supported as given by Table 4.2-1 where μ and the cyclic prefix for a carrier bandwidth part are given by the higher-layer parameters DL-BWP-mu and DL-BWP-cp for the downlink and UL-BWP-mu and UL-BWP-cp for the uplink.
[Table 4.2-1 of 3GPP R1-1721341, entitled "Supported transmission numerologies", is reproduced as FIG. 5]
4.3 Frame Structure
4.3.1 Frames and Subframes
  Downlink and uplink transmissions are organized into frames with $T_f=(\Delta f_{max} N_f/100) \cdot T_c=10$ ms duration, consisting of ten subframes of $T_{sf}=(\Delta f_{max} N_f/1000) \cdot T_c=1$ ms duration each. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.
  There is one set of frames in the uplink and one set of frames in the downlink on a carrier. Transmission of uplink frame number i from the UE shall start $T_{TA}=(N_{TA}+N_{TA,offset}) T_c$ before the start of the corresponding downlink frame at the UE where $N_{TA,offset}$ depends on the frequency band according to [38.133].
[FIG. 4.3.1-1 of 3GPP R1-1721341, entitled "Uplink-downlink timing relation", is reproduced as FIG. 6]
4.3.2 Slots
  For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.
  OFDM symbols in a slot can be classified as 'downlink' (denoted 'D' in Table 4.3.2-3), 'flexible' (denoted 'X'), or 'uplink' (denoted 'U').
  In a downlink slot, the UE shall assume downlink transmissions to occur in 'downlink' or 'flexible' symbols only.
  In an uplink slot, the UE shall transmit in 'uplink' or 'flexible' symbols only.
[Table 4.3.2-1 of 3GPP R1-1721341, entitled "Number of OFDM symbols per slot, slots per frame, and slots per subframe for normal cyclic prefix", is reproduced as FIG. 7]
[Table 4.3.2-2 of 3GPP R1-1721341, entitled "Number of OFDM symbols per slot, slots per frame, and slots per subframe for extended cyclic prefix", is reproduced as FIG. 8]
7.3.2 Physical Downlink Control Channel (PDCCH)
7.3.2.1 Control-channel Element (CCE)
  A physical downlink control channel consists of one or more control-channel elements (CCEs) as indicated in Table 7.3.2.1-1.
[Table 7.3.2.1-1 of 3GPP R1-1721341, entitled "Supported PDCCH aggregation levels", is reproduced as FIG. 9]
7.3.2.2 Control-resource Set (CORESET)
  A control-resource set consists of $N_{RB}^{CORESET}$ resource blocks in the frequency domain, given by the higher-layer parameter CORESET-freq-dom, and $N_{symb}^{CORESET} \in \{1, 2, 3\}$ symbols in the time domain, given by the higher-layer parameter CORESET-time-dur, where $N_{symb}^{CORESET}=3$ is supported only if higher-layer parameter DL-DMRS-typeA-pos equals 3.
  A control-channel element consists of 6 resource-element groups (REGs) where a resource-element group equals one resource block during one OFDM symbol. Resource-element groups within a control-resource set are numbered in increasing order in a time-first manner, starting with 0 for the first OFDM symbol and the lowest-numbered resource block in the control resource set.
  A UE can be configured with multiple control-resource sets. Each control-resource set is associated with one CCE-to-REG mapping only.
  The CCE-to-REG mapping for a control-resource set can be interleaved or non-interleaved, configured by the higher-layer parameter CORESET-CCE-REG-mapping-type, and is described by REG bundles:
    REG bundle i is defined as REGs $\{iL, iL+1, \ldots, iL+L-1\}$ where L is the REG bundle size, $i=0,1, \ldots, N_{REG}^{CORESET}/L-1$, and $N_{REG}^{CORESET}=N_{RB}^{CORESET} N_{symb}^{CORESET}$ is the number of REGs in the CORESET
    CCE j consists of REG bundles $\{f(6j/L), f(6j/L+1), \ldots, f(6j/L+6/L-1)\}$ where $f(\cdot)$ is an interleaver
    For non-interleaved CCE-to-REG mapping, $L=6$ and $f(j)=j$
    For interleaved CCE-to-REG mapping, $L \in \{2,6\}$ for $N_{symb}^{CORESET}=1$ and $L \in \{N_{symb}^{CORESET}, 6\}$, for $N_{symb}^{CORESET} \in \{2,3\}$ where L is configured by the higher-layer parameter CORESET-REG-bundle-size.

The interleaver is defined by $$f(j)=(rC+c+n_{shift}) \bmod (N_{REG}^{CORESET}/L)$$

$$j=cR+r$$

$$r=0,1,\ldots,R-1$$

$$c=0,1,\ldots,C-1$$

$$C=\lceil N_{REG}^{CORESET}/(LR) \rceil$$

where $R \in \{2,3,6\}$ is given by the higher-layer parameter CORESET-interleaver-size and where $n_{shift}$ is a function of $N_{ID}^{cell}$ for a PDCCH transmitted in a CORESET configured by the PBCH or RMSI $n_{shift} \in \{0,1,\ldots,274\}$ is a function of the higher-layer parameter CORESET-shift-index.

The UE may assume the same precoding in the frequency domain being used within a REG bundle if the higher-layer parameter CORESET-precoder-granularity equals CORESET-REG-bundle-size the same precoding in the frequency domain being used across the all resource-element groups within the set of contiguous resource blocks in the CORESET if the higher-layer parameter CORESET-precoder-granularity equals the size of the CORESET in the frequency domain For a CORESET configured by PBCH, L=6.

7.3.2.3 Scrambling

The UE shall assume the block of bits $b(0),\ldots,b(M_{bit}-1)$, where $M_{bit}$ is the number of bits transmitted on the physical channel, is scrambled prior to modulation, resulting in a block of scrambled bits $\tilde{b}(0),\ldots,\tilde{b}(M_{bit}-1)$ according to $$\tilde{b}(i)=(b(i)+c(i)) \bmod 2$$

where the scrambling sequence c(i) is given by clause 5.2.1.

7.3.2.4 PDCCH Modulation

The UE shall assume the block of bits $\tilde{b}(0),\ldots,\tilde{b}(M_{bit}-1)$ to be QPSK modulated as described in clause 5.1.3, resulting in a block of complex-valued modulation symbols $d(0),\ldots,d(M_{symb}-1)$.

7.3.2.5 Mapping to Physical Resources

The UE shall assume the block of complex-valued symbols $d(0),\ldots,d(M_{symb}-1)$ to be scaled by a factor $\beta_{PDCCH}$ and mapped to resource elements $(k,l)_{p,\mu}$ in increasing order of first k, then l, in the resource-element groups used for the monitored PDCCH.

7.4.1.3 Demodulation Reference Signals for PDCCH
7.4.1.3.1 Sequence Generation The UE shall assume the reference-signal sequence r(m) is defined by $$r(m) = \frac{1}{\sqrt{2}}(1-2\cdot c(2m)) + j\frac{1}{\sqrt{2}}(1-2\cdot c(2m+1)).$$

where the pseudo-random sequence c(i) is defined in clause 5.2.1.

7.4.1.3.2 Mapping to Physical Resources

The UE shall assume the sequence r(m) is mapped to physical resource elements according to $$a_{k,l}^{(p,\mu)}=\beta_{DMRS}\cdot r(3n+k')$$

$$k=N_{sc}^{RB}\lfloor n/N_{symb}^{CORESET}\rfloor + 4k'+1$$

$$k'=0,1,2$$

$$l=n \bmod N_{symb}^{CORESET}$$

$$n=0,1,\ldots$$

where the following conditions are fulfilled they are within the resource element groups constituting the PDCCH the UE attempts to decode if the higher-layer parameter CORESET-precoder-granularity equals CORESET-REG-bundle-size, all resource-element groups within the set of contiguous resource blocks in the CORESET where the UE attempts to decode the PDCCH if the higher-layer parameter CORESET-precoder-granularity equals the size of the CORESET in the frequency domain.

The reference point for k is subcarrier 0 of the lowest-numbered common resource block in the CORESET if the CORESET is configured by the PBCH or RMSI, subcarrier 0 in common resource block 0 otherwise The reference point for l is the first OFDM symbol for the CORESET.

A UE not attempting to detect a PDCCH in a CORESET shall not make any assumptions on the presence or absence of DM-RS in the CORESET.

In absence of CSI-RS or TRS configuration, and unless otherwise configured, the UE may assume PDCCH DM-RS and SS/PBCH block to be quasi co-located with respect to Doppler shift, Doppler spread, average delay, delay spread, and spatial Rx.

As discussed in 3GPP R1-1721342 (as provided below), DCI formats for scheduling of PDSCH may comprise a field denoted as Transmission configuration indication (TCI). The field indicates an association between DMRS (Demodulation Reference Signal) antenna ports of receiving PDSCH (Physical Downlink Shared Channel) and one or more than one reference signal(s) which is one of UE-specific RRC (Radio Resource Control) configured M TCIs. One DCI format which is denoted as DCI format2_1 is used for indicating preemption indication.

7.3.1.2 DCI Formats for Scheduling of PDSCH
7.3.1.2.1 Format 1_0

DCI format 1_0 is used for the scheduling of PDSCH in one DL cell.

The following information is transmitted by means of the DCI format 1_0:

Identifier for DCI formats—[1] bits

Frequency domain resource assignment—$\lceil \log_2(N_{RB}^{UL,BWP}(N_{RB}^{UL,BWP}+1)/2)\rceil$ bits Time domain resource assignment—X bits VRB-to-PRB mapping—1 bit Modulation and coding scheme—[5] bits as defined in section x.x of [6, TS38.214]

New data indicator–1 bit

Redundancy version—[2] bits as defined in section x.x of [6, TS38.214]

HARQ process number—[4] bits

Downlink assignment index—2 bits as defined in section 9.1.3 of [5, TS38.213]

TPC command for scheduled PUCCH—[2] bits as defined in section x.x of [5, TS38.213]

PUCCH resource indicator—[2] bits as defined in section x.x of [5, TS38.213]

PDSCH-to-HARQ_feedback timing indicator—[3] bits as defined in section x.x of [5, TS38.213]

7.3.1.2.2 Format 1_1

DCI format 1_1 is used for the scheduling of PDSCH in one cell.

The following information is transmitted by means of the DCI format 1_1:

- Carrier indicator—0 or 3 bits as defined in section x.x of [5, TS38.213].
- Identifier for DCI formats—[1] bits
- Bandwidth part indicator—0, 1 or 2 bits as defined in Table 7.3.1.1.2-1. The bitwidth for this field is determined according to the higher layer parameter BandwidthPart-Config for the PDSCH.
- Frequency domain resource assignment—$\lceil N_{RB}^{UL,BWP}/P \rceil$ bits if only resource allocation type 0 is configured, $\lceil \log_2(N_{RB}^{UL,BWP}(N_{RB}^{UL,BWP}+1)/2) \rceil$ bits if only resource allocation type 1 is configured, or max ($\lceil \log_2(N_{RB}^{UL,BWP}(N_{RB}^{UL,BWP}+1)/2) \rceil$, $\lceil N_{RB}^{UL,BWP}/P \rceil$)+1 bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $\lceil N_{RB}^{UL,BWP}/P \rceil$ LSBs provide the resource allocation as defined in section 6.1.2.2.1 of [6, TS38.214].
  - For resource allocation type 1, the $\lceil \log_2(N_{RB}^{UL,BWP}(N_{RB}^{UL,BWP}+1)/2) \rceil$ LSBs provide the resource allocation as defined in section 6.1.2.2.2 of [6, TS38.214]
- Time domain resource assignment —1, 2, 3, or 4 bits as defined in section X.X of [6, TS38.214]. The bitwidth for this field is determined according to the higher layer parameter XXX.
- VRB-to-PRB mapping –0 or 1 bit, only applicable to resource allocation type 1, as defined in section xxx of [4, TS38.211].
  - 0 bit if only resource allocation type 0 is configured; 1 bit otherwise.
- PRB bundling size indicator—0 bit if the higher layer parameter PRB_bundling=OFF or 1 bit if the higher layer parameter PRB_bundling=ON, as defined in section x.x of [6, TS38.214].
- Rate matching indicator—0, 1, or 2 bits according to higher layer parameter rate-match-PDSCH-resource-set.
- ZP CSI-RS trigger—X bits
- For transport block 1:
- Modulation and coding scheme—5 bits as defined in section x.x of [6, TS38.214]
- New data indicator—1 bit
- Redundancy version—2 bits as defined in section x.x of [6, TS38.214]
- For transport block 2:
- Modulation and coding scheme—5 bits as defined in section x.x of [6, TS38.214]
- New data indicator—1 bit
- Redundancy version—2 bits as defined in section x.x of [6, TS38.214]
- HARQ process number—4 bits
- Downlink assignment index—number of bits as defined in the following
  - 4 bits if the higher layer parameter HARQ-ACK-codebook=dynamic, where the 2 MSB bits are the counter DAI and the 2 LSB bits are the total DAI;
  - 0 bits otherwise.
- TPC command for scheduled PUCCH—2 bits as defined in section x.x of [5, TS38.213]
- PUCCH resource indicator—2 bits as defined in section x.x of [5, TS38.213]
- PDSCH-to-HARQ_feedback timing indicator—3 bits as defined in section x.x of [5, TS38.213]
- Antenna port(s)—4, 5, or 6 bits as defined by Tables 7.3.1.2.2-1/2/3/4, where the number of CDM groups without data of values 1, 2, and 3 refers to CDM groups {0}, {0,1}, and {0, 1,2} respectively.
- Transmission configuration indication—0 bit if higher layer parameter tci-PresentInDCI is not enabled; otherwise 3 bits as defined in section x.x of [6, TS38.214].
- SRS request—2 bits as defined by Table 7.3.1.1.2-5.
- CBG transmission information—0, 2, 4, 6, or 8 bits as defined in section x.x of [6, TS38.214], determined by higher layer parameter maxCodeBlockGroupsPerTransportBlock for the PDSCH.
- CBG flushing out information—0 or 1 bit as defined in section x.x of [6, TS38.214], determined by higher layer parameter codeBlockGroupFlushIndicator.
- DMRS sequence initialization—1 bit if transform precoding is enabled

7.3.1.3 DCI Formats for other Purposes

7.3.1.3.1 Format 2_0

DCI format 2_0 is used for notifying the slot format.

The following information is transmitted by means of the DCI format 2_0:

- Identifier for DCI formats—[1] bits
- Slot format indicator 1, Slot format indicator 2, . . . , Slot format indicator N.

The size of DCI format 2_0 is configurable by higher layers, according to section 11.1.1 of [5, TS38.213].

7.3.1.3.2 Format 2_1

DCI format 2_1 is used for notifying the PRB(s) and OFDM symbol(s) where UE may assume no transmission is intended for the UE.

The following information is transmitted by means of the DCI format 2_1:

- Identifier for DCI formats—[1] bits
- Pre-emption indication 1, Pre-emption indication 2, . . . , Pre-emption indication N.

The size of DCI format 2_1 is configurable by higher layers, according to section 11.2 of [5, TS38.213]. Each pre-emption indication is 14 bits.

7.3.1.3.3 Format 2_2

DCI format 2_2 is used for the transmission of TPC commands for PUCCH and PUSCH.

The following information is transmitted by means of the DCI format 2_2:

- Identifier for DCI formats—[1] bits
- TPC command number 1, TPC command number 2, . . . , TPC command number N The parameter xxx provided by higher layers determines the index to the TPC command number for a cell. Each TPC command number is 2 bits.

7.3.1.3.3 Format 2_3

DCI format 2_3 is used for the transmission of a group of TPC commands for SRS transmissions by one or more UEs. Along with a TPC command, a SRS request may also be transmitted.

The following information is transmitted by means of the DCI format 2_3:

- Identifier for DCI formats—[1] bits
- block number 1, block number 2, . . . , block number B where the starting position of a block is determined by the parameter startingBitOfFormat2_3 provided by higher layers for the UE configured with the block.

For an UL without PUCCH and PUSCH or an UL on which the SRS power control is not tied with PUSCH power control, one block is configured for the UE by higher layers, with the following fields defined for the block:

SRS request—0 or 2 bits. The presence of this field is according to the definition in section x.x of [5, TS38.213]. If present, this field is interpreted as defined by Table 7.3.1.1.2-5.

TPC command number—2 bits

3GPP R1-1721343 provides the description below about UE procedure for receiving control information. A CORE-SET can be configured with an association between DMRS (Demodulation Reference Signal) antenna port of receiving the CORESET and one or more than one reference signal(s). Second quoted paragraph specifies UE's behavior related to current discontinuous transmission indication. NW (Network) can configure a UE with one or more than one CORESET(s) for monitoring and receiving preemption indication. BWP (Bandwidth Part) related description are also provided below.

10 UE Procedure for Receiving Control Information

If the UE is configured with a SCG, the UE shall apply the procedures described in this clause for both MCG and SCG
  When the procedures are applied for MCG, the terms 'secondary cell', 'secondary cells', 'serving cell', 'serving cells' in this clause refer to secondary cell, secondary cells, serving cell, serving cells belonging to the MCG respectively.
  When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE shall monitor a set of PDCCH candidates in one or more control resource sets on the active DL BWP on each activated serving cell according to corresponding search spaces where monitoring implies decoding each PDCCH candidate according to the monitored DCI formats.

A UE can be configured by higher layer parameter SSB-periodicity-serving-cell a periodicity of half frames for transmission of SS/PBCH blocks in a serving cell. If the UE has received SSB-transmitted-SIB1 and has not received SSB-transmitted and if REs for a PDCCH reception overlap with REs corresponding to SS/PBCH block indexes indicated by SSB-transmitted-SIB1, the UE receives the PDCCH by excluding REs corresponding to SS/PBCH block indexes indicated by SSB-transmitted-SIB1. If a UE has received SSB-transmitted and if REs for a PDCCH reception overlap with REs corresponding to SS/PBCH block indexes indicated by SSB-transmitted, the UE receives the PDCCH by excluding REs corresponding to SS/PBCH block indexes indicated by SSB-transmitted.

If a carrier aggregation capability for a UE, as included in UE-NR-Capability, is larger than X, the UE includes in UE-NR-Capability an indication for a maximum number of PDCCH candidates the UE can monitor per slot when the UE is configured for carrier aggregation operation over more than X cells. When the UE is configured for carrier aggregation operation over more than X cells, the UE is not expected to be configured with a number of PDCCH candidates to monitor per slot that is larger than the maximum number.

10.1 UE Procedure for Determining Physical Downlink Control Channel Assignment

A set of PDCCH candidates for a UE to monitor is defined in terms of PDCCH search spaces. A search space can be a common search space or a UE-specific search space. A UE shall monitor PDCCH candidates in non-DRX slots in one or more of the following search spaces
  a Type0-PDCCH common search space for a DCI format with CRC scrambled by a SI-RNTI on a primary cell;
  a Type0A-PDCCH common search space for a DCI format with CRC scrambled by a SI-RNTI on a primary cell;
  a Type1-PDCCH common search space for a DCI format with CRC scrambled by a RA-RNTI, or a TC-RNTI, or a C-RNTI on a primary cell;
  a Type2-PDCCH common search space for a DCI format with CRC scrambled by a P-RNTI on a primary cell;
  a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s); and
  a UE-specific search space for a DCI format with CRC scrambled by C-RNTI or CS-RNTI(s).

A UE is provided a configuration for a control resource set for Type0-PDCCH common search space by higher layer parameter RMSI-PDCCH-Config and a subcarrier spacing by higher layer parameter RMSI-scs for PDCCH reception. The UE determines the control resource set and the monitoring occasions for Type0-PDCCH common search space as described in Subclause 14. The Type0-PDCCH common search space is defined by the CCE aggregation levels and the number of candidates per CCE aggregation level given in Table 10.1-1.

The UE may assume that the DM-RS antenna port associated with PDCCH reception in the Type0-PDCCH common search space and the Type2-PDCCH common search space, and for corresponding PDSCH receptions, and the DM-RS antenna port associated with SS/PBCH reception are quasi co-located with respect to delay spread, Doppler spread, Doppler shift, average delay, and spatial Rx parameters. The value for the DM-RS scrambling sequence initialization is the cell ID.

For Type0A-PDCCH common search space or for Type-2 PDCCH common search space, the control resource set is same as the control resource set for Type0-PDCCH common search space. A UE is provided a configuration for Type0A-PDCCH common search space by higher layer parameter osi-SearchSpace. A UE is provided a configuration for Type2-PDCCH common search space by higher layer parameter paging-SearchSpace.

A subcarrier spacing and a CP length for PDCCH reception with Type0A-PDCCH common search space, or Type1-PDCCH common search space, or Type-2 PDCCH common search space are same as for PDCCH reception with Type0-PDCCH common search space.

A UE may assume that the DM-RS antenna port associated with PDCCH reception in the Type0A-PDCCH common search space and the DM-RS antenna port associated with SS/PBCH reception are quasi co-located with respect to delay spread, Doppler spread, Doppler shift, average delay, and spatial Rx parameters.

A UE may assume that the DM-RS antenna port associated with PDCCH reception and associated PDSCH reception in the Type1-PDCCH common search space are quasi co-located with the DM-RS antenna port of the SS/PBCH reception associated with a corresponding PRACH transmission.

If a value for the DM-RS scrambling sequence initialization for Type0A-PDCCH common search space, or Type1-PDCCH common search space, or Type-2 PDCCH common search space is not provided by higher layer parameter PDCCH-DMRS-Scrambling-ID in SystemInformation-BlockType1, the value is the cell ID.

If a UE is configured for downlink bandwidth part (BWP) operation, as described in Subclause 12, the above configurations for the common search spaces apply for the initial active DL BWP. The UE can be additionally configured a control resource set for Type0-PDCCH common search space, Type0A-PDCCH common search space, Type1-PDCCH common search space, or Type2-PDCCH common search space for each configured DL BWP on the primary cell, other than the initial active DL BWP, as described in Subclause 12.

[Table 10.1-1 of 3GPP R1-1721343, entitled "CCE aggregation levels and number of candidates per CCE aggregation level for PDCCH scheduling SysteminformationBlock-Type1 in Type0-PDCCH common search space", is reproduced as FIG. 10]

For a serving cell, higher layer signalling provides a UE with P control resource sets. For control resource set p, 0≤p<P where a UE-specific search space, a Type2-PDCCH common search space, or a Type3-PDCCH common search space is mapped, the higher layer signalling provides:

- a control resource set index by higher layer parameter CORESET-ID;
- a DM-RS scrambling sequence initialization value by higher layer parameter PDCCH-DMRS-Scrambling-ID;
- a number of consecutive symbols provided by higher layer parameter CORESET-time-duration;
- a set of resource blocks provided by higher layer parameter CORESET-freq-dom;
- a CCE-to-REG mapping provided by higher layer parameter CORESET-CCE-to-REG-mapping-type;
- a REG bundle size, in case of interleaved CCE-to-REG mapping, provided by higher layer parameter CORESET-REG-bundle-size;
- a cyclic shift for the REG bundle interleaver [4, 38.211] by higher layer parameter CORESET-shift-index;
- an antenna port quasi co-location, from a set of antenna port quasi co-locations provided by higher layer parameter TCI-StatesPDCCH, indicating quasi co-location information of the DM-RS antenna port for PDCCH reception;
- an indication for a presence or absence of a transmission configuration indication (TCI) field for DCI format 1_0 or DCI format 1_1 transmitted by a PDCCH in control resource set p, by higher layer parameter TCI-PresentInDCI.

For each control resource set in a DL BWP of a serving cell, a respective higher layer parameter CORESET-freq-dom provides a bitmap. The bits of the bitmap have a one-to-one mapping with non-overlapping groups of 6 PRBs, in ascending order of the PRB index in the DL BWP bandwidth of $N_{RB}^{BWP}$ PRBs where the first PRB of the first group of 6 PRBs has index $6 \cdot \lceil N_{RB}^{BWP}/6 \rceil$. If the UE has not received an indication for an antenna port quasi co-location from the set of antenna port quasi co-locations provided by TCI-StatesPDCCH, the UE assumes that the DM-RS antenna port associated with PDCCH reception in the UE-specific search space is quasi co-located with the DM-RS antenna port associated with PBCH reception with respect to delay spread, Doppler spread, Doppler shift, average delay, and spatial Rx parameters.

For each serving cell that a UE is configured to monitor PDCCH in a search space other than Type0-PDCCH common search space, the UE is configured the following:

- a number of search space sets by higher layer parameter search-space-config;
- for each search space set in a control resource set p
  - an indication that the search space set is a common search space set or a UE-specific search space set by higher layer parameter Common-search-space-flag;
  - a number of PDCCH candidates $M_p^{(L)}$ per CCE aggregation level L by higher layer parameters Aggregation-level-1, Aggregation-level-2, Aggregation-level-4, Aggregation-level-8, and Aggregation-level-16, for CCE aggregation level 1, CCE aggregation level 2, CCE aggregation level 4, CCE aggregation level 8, and CCE aggregation level 16, respectively;
  - a PDCCH monitoring periodicity of $k_p$ slots by higher layer parameter Monitoring-periodicity-PDCCH-slot;
  - a PDCCH monitoring offset of $o_p$ slots, where $0 \leq o_p < k_p$, by higher layer parameter Monitoring-offset-PDCCH-slot;
  - a PDCCH monitoring pattern within a slot, indicating first symbol(s) of the control resource set within a slot for PDCCH monitoring, by higher layer parameter Monitoring-symbols-PDCCH-within-slot.

A UE determines a PDCCH monitoring occasion from the PDCCH monitoring periodicity, the PDCCH monitoring offset, and the PDCCH monitoring pattern within a slot.

A PDCCH UE-specific search space $S_{k_p}^{(L)}$ at CCE aggregation level $L \in \{1, 2, 4, 8, 16\}$ is defined by a set of PDCCH candidates for CCE aggregation level L.

If a UE is configured with higher layer parameter CrossCarrierSchedulingConfig for a serving cell the carrier indicator field value corresponds to the value indicated by CrossCarrierSchedulingConfig.

For a serving cell on which a UE monitors PDCCH candidates in a UE-specific search space, if the UE is not configured with a carrier indicator field, the UE shall monitor the PDCCH candidates without carrier indicator field. For a serving cell on which a UE monitors PDCCH candidates in a UE-specific search space, if a UE is configured with a carrier indicator field, the UE shall monitor the PDCCH candidates with carrier indicator field.

A UE is not expected to monitor PDCCH candidates on a secondary cell if the UE is configured to monitor PDCCH candidates with carrier indicator field corresponding to that secondary cell in another serving cell. For the serving cell on which the UE monitors PDCCH candidates, the UE shall monitor PDCCH candidates at least for the same serving cell.

For a control resource set p, the CCEs corresponding to PDCCH candidate $m_{n_{CI}}$ of the search space for a serving cell corresponding to carrier indicator field value $n_{CI}$ are given by $$L \cdot \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \bmod \lfloor N_{CCE,p}/L \rfloor \right\} + i$$

where
for any common search space, $Y_{p,k_p}=0$;
for a UE-specific search space, $Y_{p,k_p}=(A_p \cdot Y_{p,k_p-1}) \bmod D$, $Y_{p,-1}=n_{RNTI} \neq 0$, $A_0=39827$, $A_1=39829$, and $D=65537$;
$i=0, \Lambda, L-1$;

$n_{CI}$ is the carrier indicator field value if the UE is configured with a carrier indicator field for the serving cell on which PDCCH is monitored; otherwise, including for any common search space, $n_{CI}=0$;

$N_{CCE,p}$ is the number of CCEs, numbered from 0 to $N_{CCE,p}-1$, in control resource set p;

$m_{n_{CI}}=0, \ldots, M_{p,n_{CI}}^{(L)}-1$, where $M_{p,n_{CI}}^{(L)}$ is the number of PDCCH candidates the UE is configured to monitor for aggregation level L for a serving cell corresponding to $n_{CI}$;

for any common search space, $M_{p,max}^{(L)}=M_{p,0}^{(L)}$;

for a UE-specific search space, $M_{p,max}^{(L)}$ is the maximum of $m_{p,n_{CI}}^{(L)}$ for all corresponding DCI formats over all configured $n_{CI}$ values for a CCE aggregation level L in control resource set p;

the RNTI value used for $n_{RNTI}$ is defined in [5, TS 38.212] and in [6, TS 38.214].

A UE configured to monitor PDCCH candidates in a serving cell with a DCI format size with carrier indicator field and CRC scrambled by C-RNTI, where the PDCCH candidates may have one or more possible values of carrier indicator field for the DCI format size, shall assume that an PDCCH candidate with the DCI format size may be transmitted in the serving cell in any PDCCH UE specific search space corresponding to any of the possible values of carrier indicator field for the DCI format size.

11.2 Discontinuous Transmission Indication

If a UE is provided higher layer parameter Preemp-DL and Preemp-DL=ON, the UE is configured with an INT-RNTI provided by higher layer parameter INT-RNTI for monitoring PDCCH conveying DCI format 2_1 [5, TS 38.212]. The UE is additionally configured:

control resource set(s) and respective search space sets for monitoring PDCCH with DCI format 2_1 as described in Subclause 10.1 UE procedure for determining physical downlink control channel assignment;

a set of serving cells by higher layer parameter INT-cell-to-INT;

a mapping for each serving cell in the set of serving cells to a field in DCI format 2_1 by higher layer parameter cell-to-INT;

an information payload size for DCI format 2_1 by higher layer parameter INT-DCI-payload-length;

a monitoring periodicity for PDCCH with DCI format 2_1 by higher layer parameter INT-monitoring-periodicity;

an indication granularity for time-frequency resources by higher layer parameter INT-TF-unit.

If a UE detects a DCI format 2_1 for a serving cell from the configured set of serving cells, the UE may assume that no transmission to the UE is present in PRBs and in symbols, from a set of PRBs and a set of symbols of the last monitoring period, that are indicated by the DCI format. The set of PRBs is equal to the active DL BWP as defined in Subclause 12 Bandwidth part operation and includes $B_{INT}$ PRBs.

If a UE detects a DCI format 2_1 in a PDCCH transmitted in a control resource set in slot $m \cdot T_{INT}$, the set of symbols indicated by a field in DCI format 2_1 includes the last $14 \cdot T_{INT}$ symbols prior to the first symbol of the control resource set in slot $m \cdot T_{INT}$ where $T_{INT}$ is the value of the parameter INT-monitoring-periodicity and m is a natural number.

If the UE is configured with higher layer parameter UL-DL-configuration-common, symbols indicated as uplink by UL-DL-configuration-common are excluded from the last $14 \cdot T_{INT}$ symbols prior to the $O_{symb}^{CORESET}$ symbol in slot $m \cdot T_{INT}$. The resulting set of symbols includes a number of symbols that is denoted as $N_{INT}$.

The UE is configured the indication granularity for the set of PRBs and for the set of symbols by higher layer parameter INT-TF-unit.

If the value of INT-TF-unit is 0, 14 bits of a field in DCI format 2_1 have a one-to-one mapping with 14 groups of consecutive symbols from the set of symbols where each of the first $N_{INT}-\lfloor N_{INT}/14 \rfloor \cdot 14$ symbol groups includes $\lceil N_{INT}/14 \rceil$ symbols, each of the last $14-N_{INT}+\lfloor N_{INT}/14 \rfloor \cdot 14$ symbol groups includes $\lfloor N_{INT}/14 \rfloor$ symbols, a bit value of 0 indicates transmission to the UE in the corresponding symbol group and a bit value of 1 indicates no transmission to the UE in the corresponding symbol group.

If the value of INT-TF-granularity is 1, 7 pairs of bits of a field in the DCI format 2_1 have a one-to-one mapping with 7 groups of consecutive symbols where each of the first $N_{INT}-\lfloor N_{INT}/7 \rfloor \cdot 7$ symbol groups includes $\lceil N_{INT}/7 \rceil$ symbols, each of the last $7-N_{INT}+\lfloor N_{INT}/7 \rfloor \cdot 7$ symbol groups includes $\lfloor N_{INT}/7 \rfloor$ symbols, a first bit in a pair of bits for a symbol group is applicable to the subset of $\lceil B_{INT}/2 \rceil$ first PRBs from the set of $B_{INT}$ PRBs, a second bit in the pair of bits for the symbol group is applicable to the subset of last $\lfloor B_{INT}/2 \rfloor$ PRBs from the set of $B_{INT}$ PRBs, a bit value of 0 indicates transmission to the UE in the corresponding symbol group and subset of PRBs, and a bit value of 1 indicates no transmission to the UE in the corresponding symbol group and subset of PRBs.

12 Bandwidth Part Operation

If the UE is configured with a SCG, the UE shall apply the procedures described in this clause for both MCG and SCG When the procedures are applied for MCG, the terms 'secondary cell', 'secondary cells', 'serving cell', 'serving cells' in this clause refer to secondary cell, secondary cells, serving cell, serving cells belonging to the MCG respectively.

When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter DL-BWP and a set of at most four BWPs for transmissions by the UE (UL BWP set) in an UL bandwidth by parameter UL-BWP for the serving cell.

An initial active DL BWP is defined by a location and number of contiguous PRBs, a subcarrier spacing, and a cyclic prefix, for the control resource set for Type0-PDCCH common search space. For operation on the primary cell, a UE is provided by higher layer parameter initial-UL-BWP an initial UL BWP for a random access procedure. If the UE is configured with a secondary carrier on the primary cell, the UE can be configured with an initial BWP for random access procedure on the secondary carrier.

For unpaired spectrum operation, a UE can expect that the center frequency for a DL BWP is same as the center frequency for a UL BWP.

For each DL BWP or UL BWP in a set of DL BWPs or UL BWPs, respectively, the UE is configured the following parameters for the serving cell as defined in [4, TS 38.211] or [6, TS 38.214]:

a subcarrier spacing provided by higher layer parameter DL-BWP-mu or UL-BWP-mu;

a cyclic prefix provided by higher layer parameter DL-BWP-CP or UL-BWP-CP;

a number of contiguous PRBs provided by higher layer parameter DL-BWP-BW or UL-BWP-BW;

an index in the set of DL BWPs or UL BWPs by respective higher layer parameters DL-BWP-index or UL-BWP-index for paired spectrum operation, or a link between a DL BWP and an UL BWP from the set of configured DL BWPs and UL BWPs by higher layer parameter BWP-pair-index for unpaired spectrum operation;

a DCI 1_0 or DCI 1_1 detection to a PDSCH reception timing by higher layer parameter DL-data-time-domain, a PDSCH reception to a HARQ-ACK transmission timing value by higher layer parameter DL-data-DL-acknowledgement, a DCI 0_0 or DCI 0_1 detection to a PUSCH transmission timing value by higher layer parameter UL-data-time-domain;

an offset of the first PRB of the DL bandwidth or the UL bandwidth, respectively, relative to a first PRB of a bandwidth by higher layer parameter DL-BWP-loc or UL-BWP-loc For the downlink of the primary cell, the first PRB of the bandwidth is the first RPB of the SS/PBCH block used by the UE for initial cell selection;

For the uplink of the primary cell for paired spectrum operation, the first PRB of the bandwidth is the first PRB of the UL bandwidth indicated by SystemInformationBlockType1;

For the uplink of the primary cell for unpaired, the first PRB of the bandwidth is the first PRB of the SS/PBCH block used by the UE for initial cell selection;

For a secondary cell or carrier, the first PRB of the DL bandwidth or of the UL bandwidth is indicated to the UE by the higher layer configuration for the secondary cell or carrier.

For each DL BWP in a set of DL BWPs on the primary cell, a UE can be configured control resource sets for every type of common search space and for UE-specific search space as described in Subclause 10.1 UE procedure for determining physical downlink control channel assignment. The UE is not expected to be configured without a common search space on the PCell, or on the PSCell, in the active DL BWP. For each UL BWP in a set of UL BWPs, the UE is configured resource sets for PUCCH transmissions as described in Subclause Error! Reference source not found.

A UE receives PDCCH and PDSCH in a DL BWP according to a configured subcarrier spacing and CP length for the DL BWP. A UE transmits PUCCH and PUSCH in an UL BWP according to a configured subcarrier spacing and CP length for the UL BWP.

If a bandwidth path indicator field is configured in DCI format 1_1, the bandwidth path indicator field value indicates the active DL BWP, from the configured DL BWP set, for DL receptions. If a bandwidth path indicator field is configured in DCI format 0_1, the bandwidth path indicator field value indicates the active UL BWP, from the configured UL BWP set, for UL transmissions.

For the primary cell, a UE can be provided by higher layer parameter Default-DL-BWP a default DL BWP among the configured DL BWPs. If a UE is not provided a default DL BWP by higher layer parameter Default-DL-BWP, the default BWP is the initial active DL BWP.

A UE can be provide by higher layer parameter BWP-InactivityTimer a timer value for the primary cell, as described in [11, TS 38.321] and then the UE starts the timer each time the UE detects a DCI format 1_1 indicating an active DL BWP, other than the default DL BWP, for paired spectrum operation or each time the UE detects DCI format 1_1 or DCI format 0_1 indicating an active DL BWP or UL BWP, other than the default DL BWP or UL BWP, for unpaired spectrum operation. The UE increments the timer every interval of 1 millisecond for carrier frequencies smaller than or equal to 6 GHz or every interval of 0.5 milliseconds for carrier frequencies larger than 6 GHz if the UE does not detect any DCI format 1_1 for paired spectrum operation or if the UE does not detect any DCI format 1_1 or DCI format 0_1 for unpaired spectrum operation during the interval. The timer expires when the timer is equal to the BWP-InactivityTimer value. The UE switches to the default DL BWP from an active DL BWP when the timer expires.

If a UE is configured for a secondary cell with higher layer parameter Default-DL-BWP indicating a default DL BWP among the configured DL BWPs and the UE is configured with higher layer parameter BWP-Inactivity-Timer indicating a timer value, the UE procedures on the secondary cell are same as on the primary cell using the timer value for the secondary cell and the default DL BWP for the secondary cell.

If the UE is configured by higher layer parameter Active-BWP-DL-SCell a first active DL BWP and by higher layer parameter Active-BWP-UL-SCell a first active UL BWP on a secondary cell or carrier, the UE uses the indicated DL BWP and the indicated UL BWP on the secondary cell as the respective first active DL BWP and first active UL BWP on the secondary cell or carrier.

For paired spectrum operation, a UE is not expected to transmit HARQ-ACK if the UE changes its active UL BWP between a time of a detection of a DCI format 1_1 and a time of a corresponding HARQ-ACK transmission.

A UE is not expected to monitor PDCCH when the UE performs measurements over a bandwidth that is not within the DL BWP for the UE.

In 3GPP R1-1721344, spatial association of PDSCH reception is described as follow:

5.1.5 Antenna Ports Quasi-colocation

The UE can be configured up to M TCI-States by higher layer signalling to decode PDSCH according to a detected PDCCH with DCI intended for the UE and the given serving cell where M depends on the UE capability. Each configured TCI state includes one RS set TCI-RS-SetConfig. Each TCI-RS-SetConfig contains parameters for configuring quasi co-location relationship between the reference signals in the RS set and the DM-RS port group of the PDSCH. The RS set contains a reference to either one or two DL RSs and an associated quasi co-location type (QCL-Type) for each one configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and may take one or a combination of the following types:

QCL-TypeA: {Doppler shift, Doppler spread, average delay, delay spread}
QCL-TypeB: {Doppler shift, Doppler spread}
QCL-TypeC: {average delay, Doppler shift}
QCL-TypeD: {Spatial Rx parameter}

The UE receives a selection command [10, TS 38.321] used to map up to 8 TCI states to the codepoints of the DCI field TCI-states. Until a UE receives higher layer configuration of TCI states and before reception of the activation command, the UE may assume that the antenna ports of one DM-RS port group of PDSCH of a serving cell are spatially quasi co-located with the SSB determined in the initial access procedure. When the number of TCI states in TCI-States is less than or equal to 8, the DCI field TCI-states directly indicates the TCI state.

If a UE is configured with the higher layer parameter TCI-PresentInDCI is set as 'Enabled' for the CORESET scheduling the PDSCH, the UE assumes that the TCI field is present in the DL DCI of the PDCCH transmitted on the CORESET. If TCI-PresentInDCI is set as 'Disabled' for the CORESET scheduling the PDSCH, for determining PDSCH antenna port quasi co-location, the UE assumes that the TCI state for the PDSCH is identical wo the TCI state applied for the CORESET used for the PDCCH transmission.

If the TCI-PresentinDCI is set as 'Enabled', the UE shall use the TCI-States according to the value of the 'Transmission Configuration Indication' field in the detected PDCCH with DCI for determining PDSCH antenna port quasi co-location. The UE may assume that the antenna ports of one DM-RS port group of PDSCH of a serving cell are quasi co-located with the RS(s) in the RS set with respect to the QCL type parameter(s) given by the indicated TCI state if the offset between the reception of the DL DCI and the corresponding PDSCH is equal to or greater than a threshold Threshold-Sched-Offset, where the threshold is FFS. For both the case when TCI-PresentInDCI='Enabled' and TCI-PresentInDCI='Disabled' lithe offset is less than a threshold, the UE may assume that the antenna ports of one DM-RS port group of PDSCH of a serving cell are quasi co-located based on the TCI state used for PDCCH quasi-colocation indication of the lowest CORESET-ID in the latest slot in which one or more CORESETs are configured for the UE.

As discussed in 3GPP R1-1801155, a UE can be configured for monitoring PDCCH conveying a DCI indicating more than one preemption indication (PI) for different cell. In addition, the UE's activated bandwidth part (BWP) in each cell may have different subcarrier spacing. Configured monitoring periodicity of PI depends on subcarrier spacing (SCS) of activated BWP of one configured serving cell.

11.2 Discontinuous Transmission Indication

If a UE is provided higher layer parameter Preemp-DL and Preemp-DL=ON, the UE is configured with an INT-RNTI provided by higher layer parameter INT-RNTI for monitoring PDCCH conveying DCI format 2_1 [5, TS 38.212]. The UE is additionally configured:

control resource set(s) and respective search space sets for monitoring PDCCH with DCI format 2_1 as described in Subclause 10.1 UE procedure for determining physical downlink control channel assignment;

a set of serving cells by higher layer parameter INT-cell-to-INT;

a mapping for each serving cell in the set of serving cells to a field in DCI format 2_1 by higher layer parameter cell-to-INT;

an information payload size for DCI format 2_1 by higher layer parameter INT-DCI-payload-length;

a monitoring periodicity for PDCCH with DCI format 2_1 by higher layer parameter INT-monitoring-periodicity;

an indication granularity for time-frequency resources by higher layer parameter INT-TF-unit for each serving cell in the set of serving cells.

If a UE detects a DCI format 2_1 for an active DL BWP of a serving cell from the configured set of serving cells, the UE may assume that no transmission to the UE is present in PRBs and in symbols excluding SS/PBCH block if present, from a set of PRBs in the active DL BWP and a set of symbols of the last monitoring period, that are indicated by a respective field in the DCI format according to the mapping for each serving cell in the set of serving cells provided by higher layer parameter cell-to-INT. A UE is not expected to take into account the indication by DCI format 2_1 detected in a DL BWP for a PDSCH scheduled in a different DL BWP of the same serving cell.

The set of PRBs is equal to the active DL BWP as defined in Subclause 12 Bandwidth part operation and includes $B_{INT}$ PRBs.

If a UE detects a DCI format 2_1 in a PDCCH transmitted in a control resource set in slot $m \cdot T_{INT}$, the set of symbols indicated by a field in DCI format 2_1 includes the last $N_{symb}^{slot} \cdot T_{INT} \cdot 2^{\mu-\mu_{INT}}$ symbols prior to the first symbol of the control resource set in slot $m \cdot T_{INT}$ where $T_{INT}$ is the value of the parameter INT-monitoring-periodicity and m is a natural number, $N_{symb}^{slot}$ and $\mu$ are the number of OFDM symbols within a slot and the subcarrier spacing configuration respectively for a serving cell associated with the respective field in the detected DCI format 2_1, $\mu_{INT}$ is the subcarrier spacing configuration of the DL BWP of the serving cell where the DCI format 2_1 is detected.

If the UE is configured with higher layer parameter UL-DL-configuration-common, symbols indicated as uplink by UL-DL-configuration-common are excluded from the last $N_{symb}^{slot} \cdot T_{INT} \cdot 2^{\mu-\mu_{INT}}$ symbols prior to the first symbol of the control resource set in slot in $m \cdot T_{INT}$. The resulting set of symbols includes a number of symbols that is denoted as $N_{INT}$.

The UE is configured the indication granularity for the set of PRBs and for the set of symbols by higher layer parameter INT-TF-unit.

If the value of INT-TF-unit is 0, 14 bits of a field in DCI format 2_1 have a one-to-one mapping with 14 groups of consecutive symbols from the set of symbols where each of the first $N_{INT}-\lfloor N_{INT}/14 \rfloor \cdot 14$ symbol groups includes $\lceil N_{INT}/14 \rceil$ symbols, each of the last $14-N_{INT}+\lfloor N_{INT}/14 \rfloor \cdot 14$ symbol groups includes $\lfloor N_{INT}/14 \rfloor$ symbols, a bit value of 0 indicates transmission to the UE in the corresponding symbol group and a bit value of 1 indicates no transmission to the UE in the corresponding symbol group.

If the value of INT-TF-unit is 1, 7 pairs of bits of a field in the DCI format 2_1 have a one-to-one mapping with 7 groups of consecutive symbols where each of the first $N_{INT}-\lfloor N_{INT}/7 \rfloor \cdot 7$ symbol groups includes $\lceil N_{INT}/7 \rceil$ symbols, each of the last $7-N_{INT}+\lfloor N_{INT}/7 \rfloor \cdot 7$ symbol groups includes $\lfloor N_{INT}/7 \rfloor$ symbols, a first bit in a pair of bits for a symbol group is applicable to the subset of $\lceil B_{INT}/2 \rceil$ first PRBs from the set of $B_{INT}$ PRBs, a second bit in the pair of bits for the symbol group is applicable to the subset of last $\lfloor B_{INT}/2 \rfloor$ PRBs from the set of $B_{INT}$ PRBs, a bit value of 0 indicates transmission to the UE in the corresponding symbol group and subset of PRBs, and a bit value of 1 indicates no transmission to the UE in the corresponding symbol group and subset of PRBs.

A UE is not required to monitor DCI format 2_1 in slot $m \cdot T_{INT}$ in case no PDSCH is detected in any serving cell configured by higher layer parameter INT-cell-to-INT within the last $N_{symb}^{slot} \cdot T_{INT}$ symbols prior to the first symbol of the control resource set in slot in $m \cdot T_{INT}$.

Some or all of the following terminology and assumption may be used:

BS: A network central unit or a network node in NR that could be used to control one or multiple TRPs which are associated with one or multiple cells. Communication between BS and TRP(s) could be via fronthaul. BS may be referred to as central unit (CU), eNB, gNB, or NodeB.

TRP: A transmission and reception point could provide network coverage and could directly communicate with UEs. TRP may be referred to as distributed unit (DU) or network node.

Cell: A cell could be composed of one or multiple associated TRPs, i.e. coverage of the cell is composed of coverage of all associated TRP(s). One cell could be controlled by one BS. Cell may be referred to as TRP group (TRPG).

NR-PDCCH: A channel carries downlink control signal that could be used to control communication between a UE and a network side. A network could transmit NR-PDCCH on configured control resource set (CORESET) to the UE.

UL-control signal: An UL-control signal may be a Scheduling Request (SR), a channel state information(CSI), or a HARQ-ACK (Hybrid Automatic Repeat Request-Acknowledgement)/NACK (Negative Acknowledgement) for downlink transmission Slot: A slot could be a scheduling unit in NR (New RAT). A slot duration could be 14 OFDM (Orthogonal Frequency Division Multiplexing) symbols.

Mini-slot: A mini-slot could be a scheduling unit with duration less than 14 OFDM symbols.

Slot format information (SFI): Information of slot format of symbols in a slot. A symbol in a slot may belong to following type: downlink, uplink, flexible, or other. The slot format of a slot could at least convey transmission direction of symbols in the slot.

DL (Downlink) common signal: A DL common signal could be a data channel carrying common information that targets for multiple UEs in a cell or all UEs in a cell. Examples of DL common signal could be system information, paging, or RAR.

DL URLLC (Ultra-Reliable and Low Latency Communications): A type of DL transmission which requires very high reliability and very low latency. To fulfill the latency requirement, an example is to transmit DL URLLC in a mini-slot, e.g. the data duration could be less than 1 slot such as 1~4 OFDM symbol(s) and there may be one or multiple monitoring occasions for DL URLLC control in a slot. In this example, a UE is configured with a CORESET to monitor for DL URLLC control indicating DL URLLC transmission. The CORESET can be configured on middle symbol of a slot. The DL URLLC transmission may be transmitted on the following few symbols of the CORESET.

In a wireless communication system, radio resource utilization efficiency is important for NW to schedule UEs with multiple and/or different services. In 5G NR, multiple services with different requirements are expected to be supported. Services could be broadly classified as services requiring very low latency and high reliability (i.e. URLLC), services requiring very high data rates (i.e. Enhanced Mobile Broadband (eMBB)), or services with enhanced coverage (i.e. Massive Machine Type Communication (mMTC)). However, different services mentioned above may need different time durations and/or different subcarrier spacings (SCS). For example, it is beneficial to transmit on a fewer number of OFDM symbols and/or to transmit via a higher SCS value to meet URLLC requirement, but, for other services, latency is not the highest priority.

From NW's point of view, how to multiplex different services with different requirements in an efficient way needs to be considered. One way is via a FDM (frequency division multiplexing) manner. NW can schedule services with different QoS requirements on different frequency resources. But, NW may encounter a problem that there are no available and/or no sufficient frequency resources for some services. For example, delay-sensitive services (i.e. URLLC) may be transmitted on resources with a higher SCS which may occupy much more frequency resources to meet the latency requirement. In some situation (i.e. narrow system bandwidth, much more delay-tolerable services relative to delay-sensitive services), multiplexing services with different QoS requirements in FDM manner is not suitable.

One way could be via a TDM (time division multiplexing) manner. NW can schedule different services at different times. However, considering delay-sensitive services, waiting for the next transmission occasion in TDM manner may not satisfy requirement of the delay-sensitive services. Hence, allowing a delay-sensitive service to prioritize over a delay-tolerable service is considered. For example, when data of a delay-sensitive service arrives, NW can prioritize to schedule the delay-sensitive service on resources which have been scheduled for delay-tolerable services. NW may puncture data or information on the resources already scheduled for delay-tolerable services.

Accordingly, the concept of preemption indication (PI) is introduced. NW could indicate PI to UEs with delay-tolerable services in order to compensate reception performance of retransmission. Some detailed procedures relative to PI are mentioned in 3GPP R1-1721343. In case a UE is configured to monitor group common PDCCH for receiving PI, receiving PI can assist the UE to drop and/or ignore partial of transmission impacted by delay-sensitive services which may be scheduled for other UE(s). Considering retransmission with chase combining, dropping and/or ignoring impacted partial of the previous/first transmission can improve the decoding performance. Based on the Final Report of 3GPP TSG RAN WG1 #AH_NR2, PI is carried by a group common PDCCH. Different group common PDCCHs may indicate different PIs. In the current NR PHY standard, one group common PDCCH carrying downlink control information with DCI format 2_1 could comprise one or more than one PI. Moreover, each PI can represent for a configured serving cell. Based on configured mapping for serving cell(s) and a field in the downlink control information with DCI format 2_1, UE could know association between PI and serving cell.

Based on endorsed text proposal in 3GPP R1-1801155, in order to indicate PI of a first serving cell with different subcarrier spacing (SCS), the UE could interpret a PI of the first serving cell based on SCS of the first serving cell and SCS of a second serving cell where the UE receives the downlink control information. Note that the second serving cell can be the first serving cell if UE receives the downlink control information for the first cell on the first cell. For, example, a UE could be configured to receive downlink control information with DCI format 2_1 in a first serving cell with periodicity 1 slot indicating two PIs wherein one PI is for the first serving cell and the other PI is for a second serving cell. If SCS of activated downlink BWP of the first serving cell is 30 kHz while SCS of activated downlink BWP of the second serving cell is 15 kHz, PI for the first serving cell indicates 14 OFDM symbols with SCS 30 kHz while PI for the second serving cell indicates 7 OFDM symbols with 15 kHz. OFDM symbols indicated by both PI are prior to first OFDM symbol of a control resource set (CORESET) for monitoring the downlink control information. However, in some cases, within a PI monitoring periodicity, it may comprise part of OFDM symbol due to different SCS and/or different cyclic prefix (CP) length between the first serving cell and the second serving cell.

Accordingly, it may be an issue how the UE interprets PI when part of OFDM symbols are included in the PI monitoring periodicity.

Figure 11:
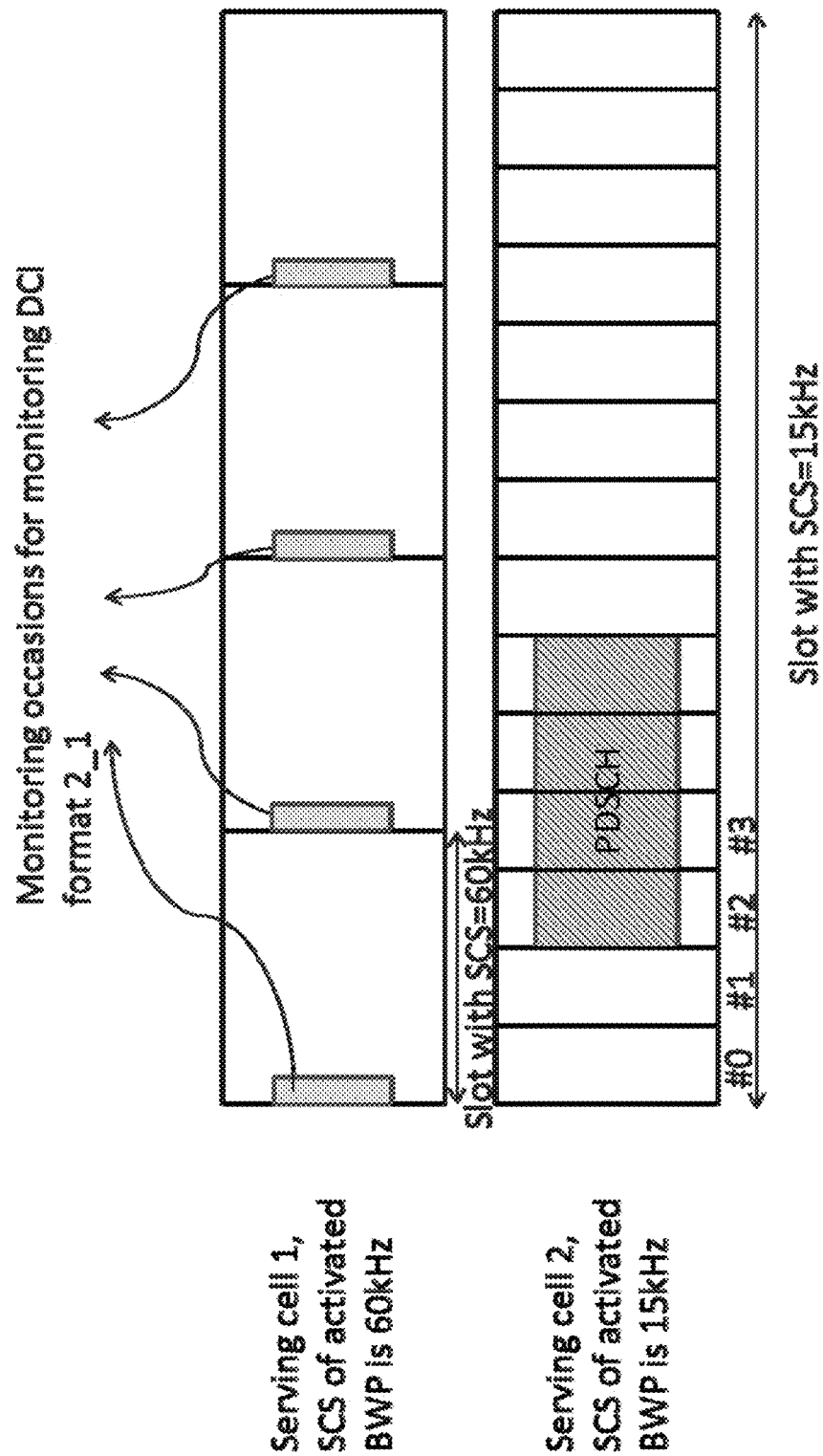
FIG. 11 is a diagram according to one exemplary embodiment.

In an example illustrated by FIG. 11, if SCS of activated downlink BWP of a first serving cell for receiving downlink control information with DCI format 2_1 is 60 kHz with PI monitoring period 1 slot and SCS of activated downlink BWP of a second serving cell is 15 kHz, the UE may be confused that whether PI for the second cell received in the second 60 kHz slot can indicate OFDM symbol #3 or not, since part of OFDM symbol #3 falls into one monitoring periodicity and the other part of OFDM symbol #3 falls into the other monitoring periodicity. In another example, in case of extended cyclic prefix (ECP), slot boundary of a downlink BWP with ECP of a serving cell may not align with normal cyclic prefix (NCP) in another serving cell. In addition, according to endorsed text proposal in 3GPP R1-1801155, a UE is not required to monitor DCI format 2_1 if there is no PDSCH detected/decoded/scheduled in previous monitoring periodicity. However, if taking into account part of OFDM symbol within the PI monitoring periodicity, how UE treats above problems needs to be solved. Potential solutions are described below.

Two general concepts of the present invention are described as follows. In one embodiment, the first general concept is that there is a restriction on configuration of receiving multiple PIs of serving cells in a DCI (Downlink Control Information). The UE is not expected to handle and/or count part of OFDM symbol within monitoring periodicity of PI. In another embodiment, the second general concept is that if a UE receives a DCI comprising at least one PI indicating part of OFDM symbol within monitoring periodicity of PI, how the UE treats this case.

In one embodiment, a UE can be configured with a set of serving cell(s). The UE can be configured with a periodicity for monitoring a downlink control information in a first serving cell indicating preemption indication (PI) of a second serving cell in the set. The periodicity can be configured with a restriction that the periodicity comprises integer number OFDM symbol(s) in the second cell. For example, if a UE receives a DCI(s) in a first serving cell indicating a PI for the first serving cell with SCS 60 kHz and/or a PI for a second serving cell with SCS 15 kHz, the UE may be configured by a base station with a periodicity as 2 slots for receiving the DCI in the first cell. In this example, with aid of the periodicity 2 slots with SCS 60 kHz, the number of OFDM symbols with SCS 15 kHz within the periodicity is 7.

In another example, a base station does not configure to a UE a periodicity as 1 slot for receiving the DCI in the first cell if the base station transmits a DCI(s) to the UE in a first serving cell indicating a PI for the first serving cell with SCS 60 kHz and/or a PI for a second serving cell with SCS 15 kHz. A UE is not expected to receive a configuration of a periodicity with 1 slot for receiving the DCI in a first cell if the UE receives/monitors a DCI(s) in the first serving cell indicating a PI for the first serving cell with SCS 60 kHz and/or a PI for a second serving cell with SCS 15 kHz. The restriction can assist number of OFDM symbol(s) within the periodicity to be an integer number.

In one embodiment, the first serving cell can be configured with a restriction that the periodicity comprises integer number OFDM symbol(s). The first serving cell can be configured as a serving cell comprising the smallest value of SCS. For example, possible SCS of configured BWP in a first serving cell are 15 kHz, 30 kHz while possible SCS of configured BWP in a second serving cell are 15 kHz, 60 kHz. In this example, in order to avoid non-integer number of OFDM symbol(s) within a configured periodicity, the first serving cell can be configured for the UE to receive downlink control information comprising two PIs for the two serving cells.

Alternatively, the restriction could be that largest value of SCS of a serving cell configured for receiving DCI is smaller than or equal to two times of smallest SCS among serving cell(s) in the set. The restriction could also be that when SCS of activated BWP of the first serving cell is 15 kHz and SCS of activated BWP of the second serving cell is 60 kHz, the UE is not expected to receive DCI indicating two PIs in the second serving cell with 1 slot monitoring periodicity for the DCI.

Alternatively, the restriction could be that when SCS of activated BWP of the first serving cell is 15 kHz and SCS of activated BWP of the second serving cell is 60 kHz, the UE receives DCI indicating one PI for the second serving cell in the second serving cell with 1 slot monitoring periodicity. For example, possible SCS of configured BWP in a first serving cell are 15 kHz, 30 kHz while possible SCS of configured BWP in a second serving cell are 15 kHz, 60 kHz and possible SCS of configured BWP in a third serving cell is 120 kHz. In this example, since the largest value of SCS of the first serving cell 30 kHz can be equal to two times of smallest value of SCS, the first serving cell can be configured for the UE to monitor DCI comprising three PIs with configured periodicity 1 slot. If the second serving cell is configured for the UE to monitor DCI comprising two PIs with configured periodicity 1 slot, 3.5 OFDM symbols may occur in 1 slot when SCS of activated BWP of the second serving cell is 60 kHz and SCS of activated BWP of the first serving cell is 15 kHz. Similarly, if the third serving cell is configured for the UE to monitor DCI comprising three PIs, SCS value of the third serving cell can't satisfy the restriction.

In a similar example, possible SCS of configured BWP in a first serving cell are 15 kHz, 60 kHz while possible SCS of configured BWP in a second serving cell are 15 kHz, 60 kHz. In this example, both the first serving cell and the second cannot satisfy the restriction, the UE needs to be configured with a periodicity to satisfy that integer number of OFDM symbols within the periodicity. Alternatively, in this example, a restriction could be applied that the DCI indicating two PIs for these two serving cells occurs when both SCS of activated BWP of the first serving cell and the second serving cell are the same. Furthermore, if SCS of activated BWP of both serving cell are different, the UE may ignore/drop PI for the first/second serving cell when the UE receives DCI indicating two PIs in the second/first serving cell with periodicity 1 slot.

In one embodiment, the UE is not expected to handle the case that number of OFDM symbol(s) within the periodicity is not an integer number. If the UE receives a PI indicating the periodicity comprising non-integer number of OFDM symbol(s), the UE may ignore the PI. Alternatively, the UE may ignore part of PI. From the perspective of a base station or a NW, when the base station or the NW configures UE a periodicity for receiving DCI comprising multiple PIs of UE's serving cell, the NW may jointly determine the periodicity and which UE's serving cell for receiving DCI comprising PI for multiple serving cells in order to satisfy the restriction.

In one embodiment, a UE could be configured with a set of serving cell(s). The UE could be configured with a periodicity for monitoring a downlink control information in a first serving cell indicating preemption indication (PI) of serving cell in the set. The periodicity may depend on SCS of an activated BWP of the first serving cell. The periodicity may comprise a set of OFDM symbols. The size of the set of OFDM symbols depends on SCS of an activated BWP of serving cell in the set of serving cell. For example, assuming that SCS of an activated BWP of a first serving cell is 60 kHz, SCS of an activated BWP of a second serving cell is 15 kHz and the configured periodicity is 1 slot, if the UE is configured to receive a DCI(s) comprising two PIs in a first serving cell every periodicity 1 slot, the number of OFDM symbol(s) with SCS 15 kHz within the periodicity is 3.5 and the number of OFDM symbol(s) with SCS 60 kHz within the periodicity is 14. The UE may ignore an OFDM symbol with partial symbol duration. For example, assuming that SCS of an activated BWP of a first serving cell is 60 kHz, SCS of an activated BWP of a second serving cell is 15 kHz and if the UE is configured to receive a DCI(s) comprising two PIs in a first serving cell every periodicity 1 slot, the PI corresponding to 15 kHz SCS indicates resource for 3 OFDM symbols. More specifically, the UE may ignore an OFDM symbol with partial symbol duration when the UE counts how many full OFDM symbol(s) within the periodicity.

Alternatively, if an OFDM symbol with partial symbol duration is in the beginning of the periodicity, the UE may include the OFDM symbol. If the OFDM symbol with partial symbol duration is in the last of the periodicity, the UE may ignore the OFDM symbol. More specifically, the UE may ignore an OFDM symbol with partial symbol duration when the UE counts how many full OFDM symbol(s) within the periodicity. For example, assuming that SCS of an activated BWP of a first serving cell is 60 kHz, SCS of an activated BWP of a second serving cell is 15 kHz and if the UE is configured to receive a DCI(s) comprising two PIs in a first serving cell every periodicity 1 slot, the PI corresponding to 15 kHz SCS indicates resource for 3 OFDM symbols in some slot(s) and indicates resource for 4 OFDM symbols in other slot(s). Alternatively, the UE may assume two bits in the two DCIs indicating PI for a OFDM symbol would indicate a same value. The same value can be 1 or 0. One of two bits would indicate PI for a first part of the OFDM symbol and the other of the two bit would indicate PI for a second part of the OFDM symbol.

In one embodiment, the UE may not be expected to receive two DCIs wherein two bits in the two DCIs indicating PI for an OFDM symbol would indicate different value. A base station could transmit two DCIs to a UE wherein two bits in the two DCIs indicate PI for a OFDM symbol, and the base station could set the same value for the two bits. For example, assuming that SCS of an activated BWP of a first serving cell is 60 kHz, SCS of an activated BWP of a second serving cell is 15 kHz and if a UE is configured by a base station to receive a DCI(s) comprising two PIs in a first serving cell every periodicity 1 slot, the PI corresponding to 15 kHz SCS indicates resource for 3.5 OFDM symbols. A first bit in a first DCI would indicate PI for half of an OFDM symbol and a second bit in a second DCI would indicate PI for another half of the OFDM symbol.

In one embodiment, the UE may not be expected to receive the two DCI wherein the first bit and the second bit are set to different values. The base station would set the same value for the first bit and the second bit. Alternatively, two bits in the two DCIs indicating PI for a OFDM symbol could indicate different values (e.g. a first value and the second value). A UE could determine whether a corresponding resource on the OFDM symbol is transmitted or not based on the different values. If any of the two bits is set to 1, the UE determines the corresponding resource on the OFDM symbol is not transmitted. If both of the two bits are set to 0, the UE determines the corresponding resource on the OFDM symbol is transmitted. Alternatively, both of the two bits is set to 1, the UE determines the corresponding resource on the OFDM symbol is not transmitted.

If any of the two bits is set to 1, the UE could determine the corresponding resource on the OFDM symbol is transmitted. For example, assuming that SCS of an activated BWP of a first serving cell is 60 kHz, SCS of an activated BWP of a second serving cell is 15 kHz and if a UE is configured by a base station to receive a DCI(s) comprising two PIs in a first serving cell every periodicity 1 slot, the PI corresponding to 15 kHz SCS indicates resource for 3.5 OFDM symbols. A first bit in a first DCI would indicate PI for half of an OFDM symbol and a second bit in a second DCI would indicate PI for another half of the OFDM symbol. The UE could determine whether a corresponding resource on the OFDM symbol is transmitted or not based on a first value of the first bit and a second value of the second bit.

If any of the first bit and the second bit is set to 1, the UE could determine the corresponding resource on the OFDM symbol is not transmitted. If both of the first bit and the second bit are set to 0, the UE determines the corresponding resource on the OFDM symbol is transmitted. Alternatively, both of the first bit and the second bit are set to 1, the UE determines the corresponding resource on the OFDM symbol is not transmitted. If any of the first bit and the second bit is set to 1, the UE determines the corresponding resource on the OFDM symbol is transmitted.

Figure 13:
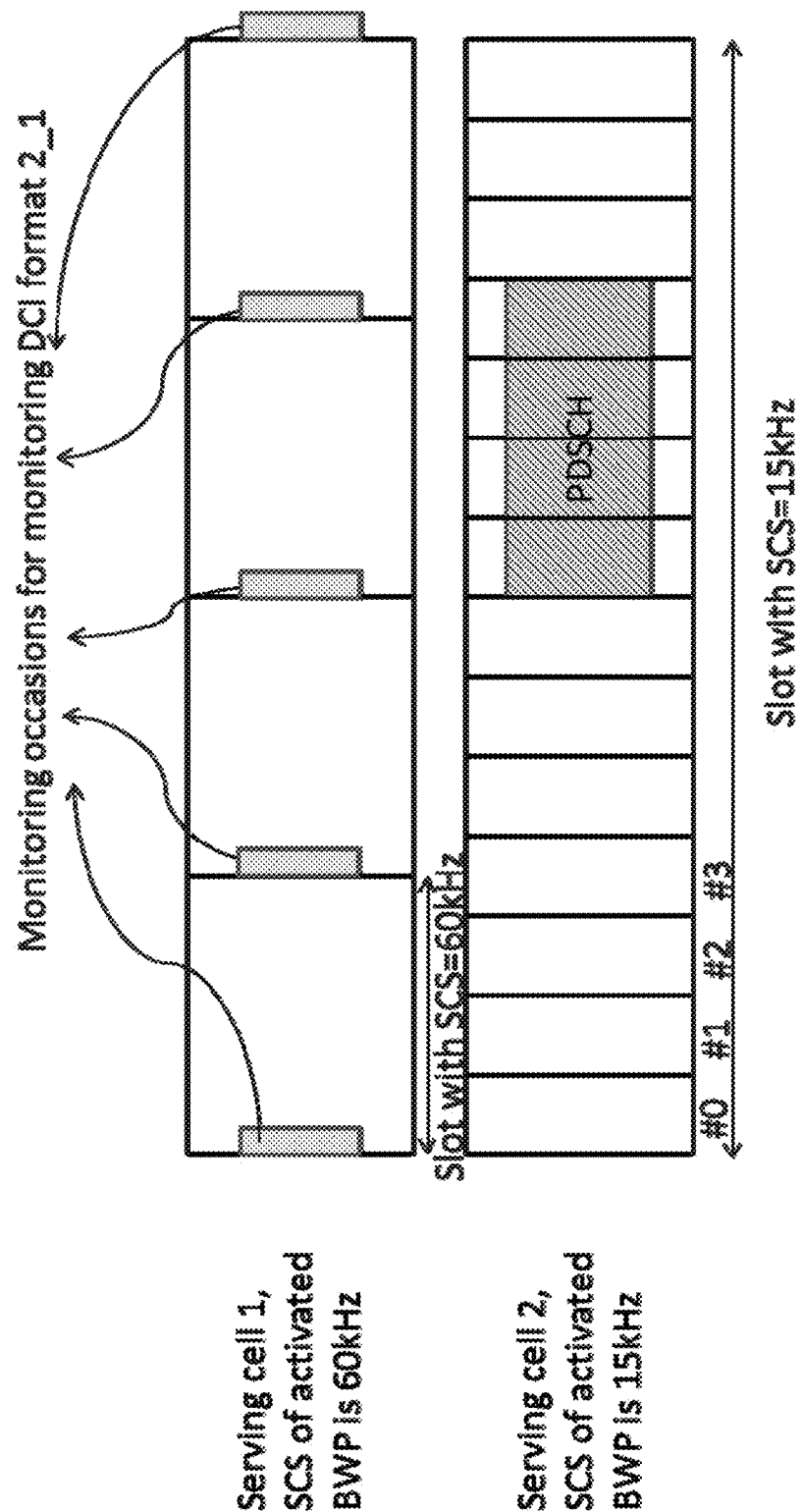
FIG. 13 is a diagram according to one exemplary embodiment.

In case at least an OFDM symbol with partial symbol duration within the periodicity, the UE may ignore the OFDM symbol when the UE determines whether there is PDSCH is transmitted on the OFDM symbol. For example, in FIG. 13, the UE may not be required to (or does not) monitor DCI at the fifth monitoring occasion since the UE may ignore OFDM symbol with half symbol duration in the second serving cell. The DCI may comprise two PIs. The UE may not be required to (or does not) monitor DCI at the fifth monitoring occasion even if there is PDSCH detected/decoded/scheduled in a previous monitoring periodicity of the fifth monitoring occasion. The PDSCH detected/decoded/scheduled in a previous monitoring periodicity of the fifth monitoring occasion comprises half of a OFDM symbol.

Alternatively, in case at least an OFDM symbol with partial symbol duration within the periodicity, the UE may include the OFDM symbol when the UE determines whether there is PDSCH is transmitted on the OFDM symbol. Furthermore, in case at least an OFDM symbol with partial symbol duration within the periodicity, the UE may include the OFDM symbol if the OFDM symbol is in the beginning of the periodicity when the UE determines whether there is PDSCH is transmitted on the OFDM symbol. In case at least an OFDM symbol with partial symbol duration within the periodicity, the UE may ignore the OFDM symbol if the OFDM symbol is in the last of the periodicity when the UE determines whether there is PDSCH is transmitted on the OFDM symbol. For example, in FIG. 13, since the UE may know there is PDSCH transmission in the second serving cell, the UE may monitor a DCI comprising PI(s) on the fifth monitoring occasion.

Figure 14:
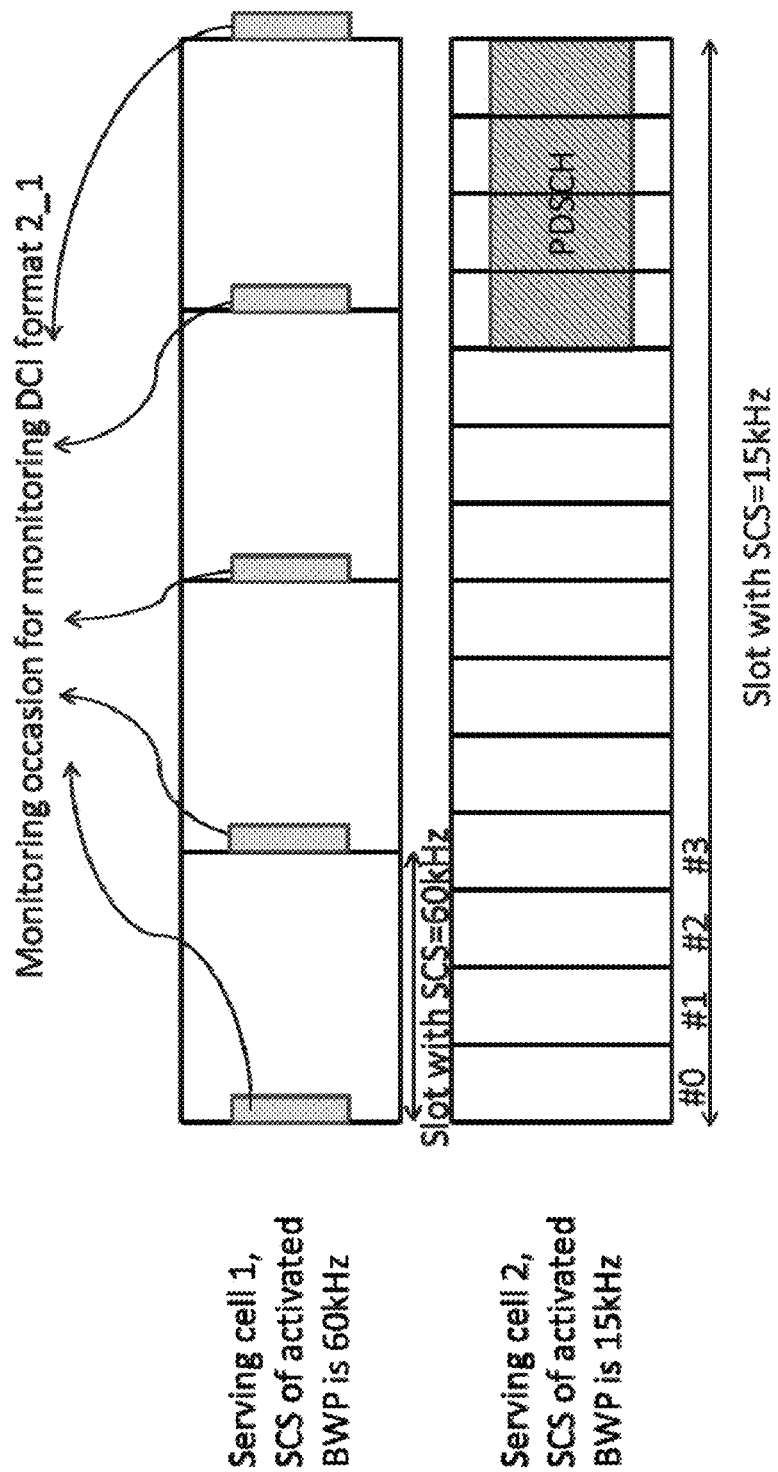
FIG. 14 is a diagram according to one exemplary embodiment.

However, in FIG. 14, the UE may skip monitoring a DCI comprising PI(s) on the fourth monitoring occasion. The UE may not be required to (or does not) monitor DCI at the fourth monitoring occasion even if there is PDSCH detected/decoded/scheduled in a previous monitoring periodicity of the fourth monitoring occasion. The PDSCH detected, decoded, or scheduled in a previous monitoring periodicity of the fourth monitoring occasion comprises half of a OFDM symbol. The UE may not know there is PDSCH transmission in the second serving cell on the fourth monitoring occasion. Alternatively, in case at least an OFDM symbol with partial symbol duration within the periodicity, the UE may include the OFDM symbol if the UE is aware that there is PDSCH on the OFDM symbol when the UE determines whether there is PDSCH is transmitted on the OFDM symbol. In case at least an OFDM symbol with partial symbol duration within the periodicity, the UE may ignore the OFDM symbol if the UE is not aware that there is PDSCH on the OFDM symbol when the UE determines whether there is PDSCH is transmitted on the OFDM symbol.

Figure 12:
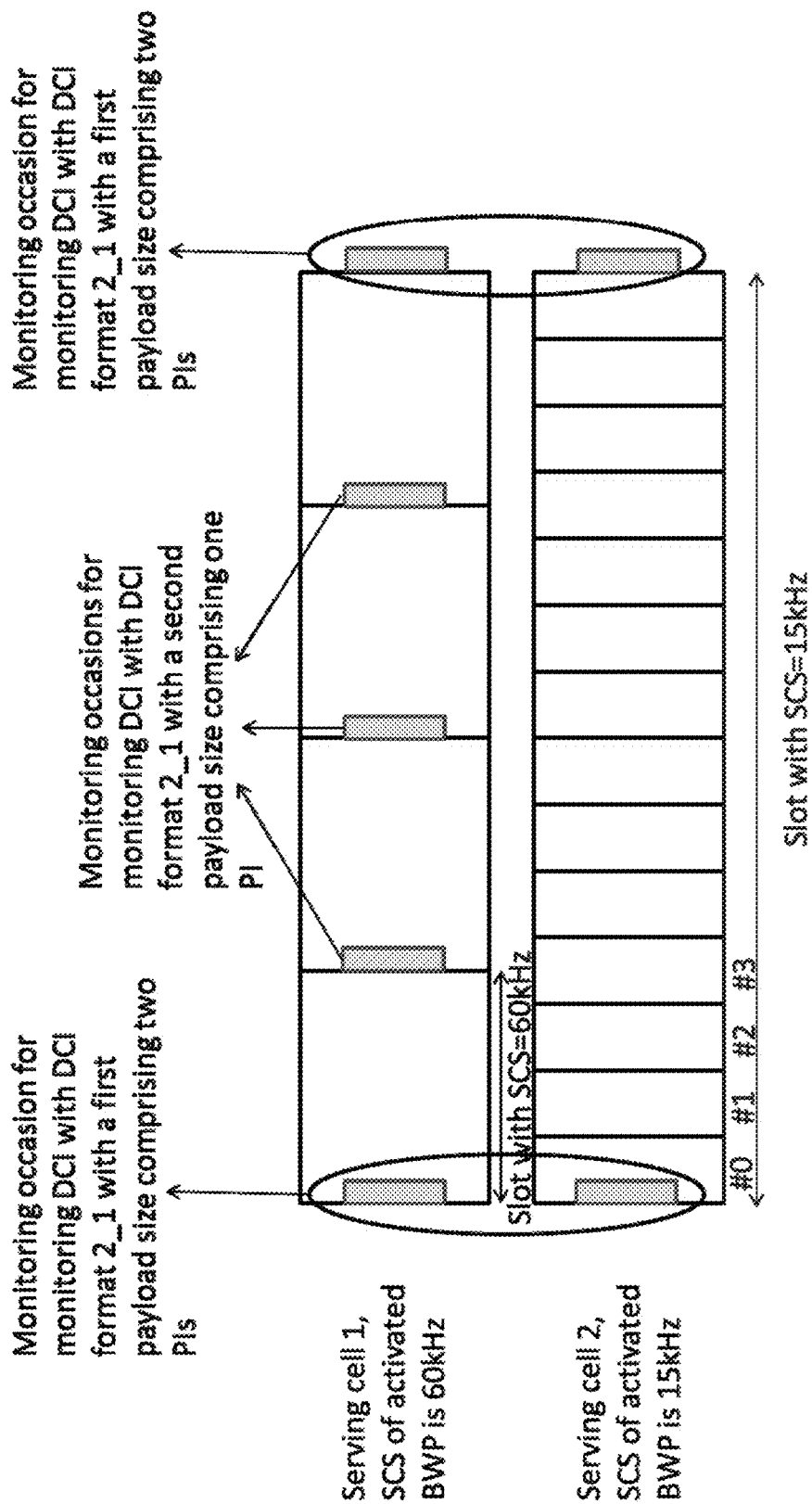
FIG. 12 is a diagram according to one exemplary embodiment.

In one embodiment, a UE could be configured with a set of serving cell(s). The UE can be configured with PI for each serving cell in the set. The UE could be configured with monitoring periodicity for each serving cell in the set. In an example illustrated by FIG. 12, a UE could be configured with two monitoring periodicity for two serving cell which 1 slot with SCS 60 kHz for the first serving cell and 1 slot with SCS 15 kHz for the second serving cell. The UE monitors a downlink control information comprising two PIs for two serving cells every 1 slot with SCS 15 kHz, while the UE monitors a downlink control information comprising one PI for the first serving cell on three internal monitoring occasion. In this example, if the UE receives a downlink control information with a first payload size, PI for the first cell is applied on the last $N_{symb}^{slot} \cdot T_{INT}$ OFDM symbols with SCS 60 kHz within 1 SCS 60 kHz slot while PI for the second cell is applied on the last $N_{symb}^{slot} \cdot T_{INT}$ OFDM symbols with 15 kHz within 1 SCS 15 kHz slot prior to the first OFDM symbol of a control resource set for receiving the downlink control information with the first payload size. Furthermore, if the UE receives the DCI with a second payload size indicating PI for the first serving cell on the first serving cell, PI for the first serving cell may be applied on the last $N_{symb}^{slot} \cdot T_{INT}$ OFDM symbols with SCS 60 kHz within 1 SCS 60 kHz prior to the first OFDM symbol of a control resource set for receiving the downlink control information with the second payload size. The UE may not be required to monitor the downlink control information with the first payload size in case no PDSCH is detected within the last $N_{symb}^{slot} \cdot T_{INT}$ OFDM symbols with SCS 60 kHz in the first serving cell and/or within the last $N_{symb}^{slot} \cdot T_{INT}$ OFDM symbols with SCS 15 kHz in the second serving cell. In addition, the UE may not be required to monitor the downlink control information with the second payload size in case no PDSCH is detected within the last $N_{symb}^{slot} \cdot T_{INT}$ OFDM symbols with SCS 60 kHz in the first serving cell.

In one embodiment, the first text proposal could be written as follows:

If a UE detects a DCI format 2_1 in a PDCCH transmitted in a control resource set in slot $m \cdot T_{INT}$, the set of symbols indicated by a field in DCI format 2_1 includes the last $14 \cdot T_{INT} \cdot 2^{\mu - \mu_{INT}}$ symbols prior to the first symbol of the control resource set in slot $m \cdot T_{INT}$ where $T_{INT}$ is the value of higher layer parameter INT-monitoring-periodicity, $\mu$ is the subcarrier spacing configuration for a serving cell with mapping to a respective field in the DCI format 2_1, $\mu_{INT}$ is the subcarrier spacing configuration of the DL BWP where the UE receives the PDCCH conveying the DCI format 2_1, and m is a natural number.

If the UE is configured with higher layer parameters UL-DL-configitration-common or UL-DL-configuration-common-Set2, symbols indicated as uplink by UL-DL-configuration-common or UL-DL-configuration-common-Set2 are excluded from the last $14 \cdot T_{INT} \cdot 2^{\mu - \mu_{INT}}$ symbols prior to the first symbol of the control resource set in slot $m \cdot T_{INT}$. The resulting set of symbols includes a number of symbols that is denoted as $N_{INT}$.

Note the UE is not expected to handle the case that $14 \cdot T_{INT} \cdot 2^{\mu - \mu_{INT}}$ is not an integer number.

In another embodiment, the second text proposal could be written as follows:

If a UE detects a DCI format 2_1 in a PDCCH transmitted in a control resource set in slot $m \cdot T_{INT}$, the set of symbols indicated by a field in DCI format 2_1 includes the last $14 \cdot T_{INT} \cdot 2^{\mu - \mu_{INT}}$ symbols prior to the first symbol of the control resource set in slot $m \cdot T_{INT}$ where $T_{INT}$ is the value of higher layer parameter INT-monitoring-periodicity, $\mu$ is the subcarrier spacing configuration for a serving cell with mapping to a respective field in the DCI format 2_1, $\mu_{INT}$ is the subcarrier spacing configuration of the DL BWP where the UE receives the PDCCH conveying the DCI format 2_1, and m is a natural number.

If the UE is configured with higher layer parameters UL-DL-configuration-common or UL-DL-configuration-common-Set2, symbols indicated as uplink by UL-DL-configuration-common or UL-DL-configuration-common-Set2 are excluded from the last $14 \cdot T_{INT} \cdot 2^{\mu - \mu_{INT}}$ symbols prior to the first symbol of the control resource set in slot $m \cdot T_{INT}$. If the set of symbols comprises at least a symbol with partial symbol duration, the symbol is excluded from the last $14 \cdot T_{INT} \cdot 2^{\mu - \mu_{INT}}$ prior to the first symbol of the control resource set in slot $m \cdot T_{INT}$. The resulting set of symbols includes a number of symbols that is denoted as $N_{INT}$.

Note $N_{INT}$ is an integer number.

Unchanged parts omitted

A UE is not required to monitor DCI format 2_1 in slot $m \cdot T_{INT}$ in case no PDSCH is detected in any serving cell configured by higher layer parameter INT-cell-to-INT within the last $N_{symb}^{slot} \cdot T_{INT}$ symbols prior to the first symbol of the control resource set in slot $m \cdot T_{INT}$. For serving cell with partial symbol duration in $N_{symb}^{slot} \cdot T_{INT}$, the UE doesn't take into account the symbol with partial symbol duration.

In an additional embodiment, the first text proposal could be written as follows:

If a UE detects a DCI format 2_1 in a PDCCH transmitted in a control resource set in slot $m \cdot T_{INT}$, the set of symbols indicated by a field in DCI format 2_1 includes the last $14 \cdot T_{INT} \cdot 2^{\mu - \mu_{INT}}$ symbols prior to the first symbol of the control resource set in slot $m \cdot T_{INT}$ where $T_{INT}$ is the value of higher layer parameter INT-monitoring-periodicity, $\mu$ is the subcarricr spacing configuration for a serving cell with mapping to a respective field in the DCI format 2_1, $\mu_{INT}$ is the subcarrier spacing configuration of the DL BWP where the UE receives the PDCCH conveying the DCI format 2_1, and m is a natural number.

If the UE is configured with higher layer parameters UL-DL-configuration-common or UL-DL-configuration-common-Set2, symbols indicated as uplink by UL-DL-configuration-common or UL-DL-configuration-common-Set2 are excluded from the last $14 \cdot T_{INT} \cdot 2^{\mu - \mu_{INT}}$ symbols prior to the first symbol of the control resource set in slot $m \cdot T_{INT}$. If the set of symbols comprises at least a symbol with partial symbol duration which is in the last of the set, the symbol is excluded from the last $14 \cdot T_{INT} \cdot 2^{\mu-\mu_{INT}}$ prior to the first symbol of the control resource set in slot $m \cdot T_{INT}$. If the set of symbols comprises at least a symbol with partial symbol duration which is in the beginning of the set, the symbol is included from the last $14 \cdot T_{INT} \cdot 2^{\mu-\mu_{INT}}$ prior to the first symbol of the control resource set in slot $m \cdot T_{INT}$. The resulting set of symbols includes a number of symbols that is denoted as $N_{INT}$.

Unchanged parts omitted

A UE is not required to monitor DCI format 2_1 in slot $m \cdot T_{INT}$ in case no PDSCH is detected in any serving cell configured by higher layer parameter INT-cell-to-INT within the last $N_{symb}^{slot} \cdot T_{INT}$ symbols prior to the first symbol of the control resource set in slot $m \cdot T_{INT}$. For serving cell with partial symbol duration in $N_{symb}^{slot} \cdot T_{INT}$, the UE doesn't take into account the symbol with partial symbol duration.

Figure 15:
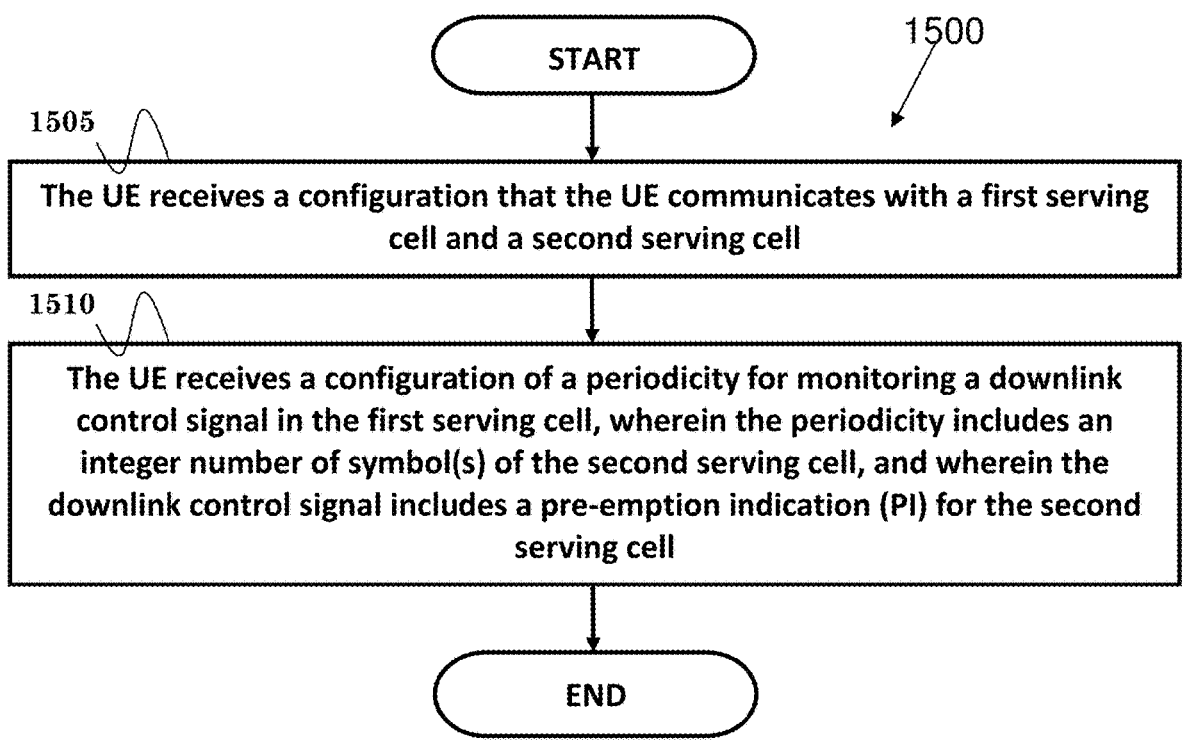
FIG. 15 is a flow chart according to one exemplary embodiment.

FIG. 15 is a flow chart 1500 according to one exemplary embodiment from the perspective of a UE. In step 1505, the UE receives a configuration that the UE communicates with a first serving cell and a second serving cell. In step 1510, the UE receives a configuration of a periodicity for monitoring a downlink control signal in the first serving cell, wherein the periodicity includes an integer number of symbol(s) of the second serving cell, and wherein the downlink control signal includes a pre-emption indication (PI) for the second serving cell.

In one embodiment, the UE may not expect to receive a configuration such that the periodicity includes a non-integer number of symbol(s) of the second serving cell. The number of symbols of the second serving cell could be a number of symbol(s) indicated by the PI for the second serving cell. Furthermore or alternatively, the number of symbols of the second serving cell within the periodicity could depend on subcarrier spacing (SCS) of an activated bandwidth part (BWP) of the second serving cell.

In one embodiment, if the first serving cell is configured with 60 KHz subcarrier spacing and the second serving cell is configured with 15 KHz subcarrier spacing, the UE could be configured by a base station with a periodicity as 2 slots or 4 slots for receiving the DCI in the first serving cell. Furthermore or alternatively, if the first serving cell is configured with 60 KHz subcarrier spacing and the second serving cell is configured with 15 KHz subcarrier spacing, the UE may not expect to receive a configuration of a periodicity with 1 slot for receiving the DCI in the first serving cell.

In one embodiment, the downlink control signal could include a PI for the first serving cell.

Referring back to FIGS. 3 and 4, in one exemplary embodiment of a UE, the device 300 includes a program code 312 stored in the memory 310. The CPU 308 could execute program code 312 to enable the UE (i) to receive a configuration that the UE communicates with a first serving cell and a second serving cell, and (ii) to receive a configuration of a periodicity for monitoring a downlink control signal in the first serving cell, wherein the periodicity includes an integer number of symbol(s) of the second serving cell, and wherein the downlink control signal includes a pre-emption indication (PI) for the second serving cell. Furthermore, the CPU 308 can execute the program code 312 to perform all of the above-described actions and steps or others described herein.

Figure 16:
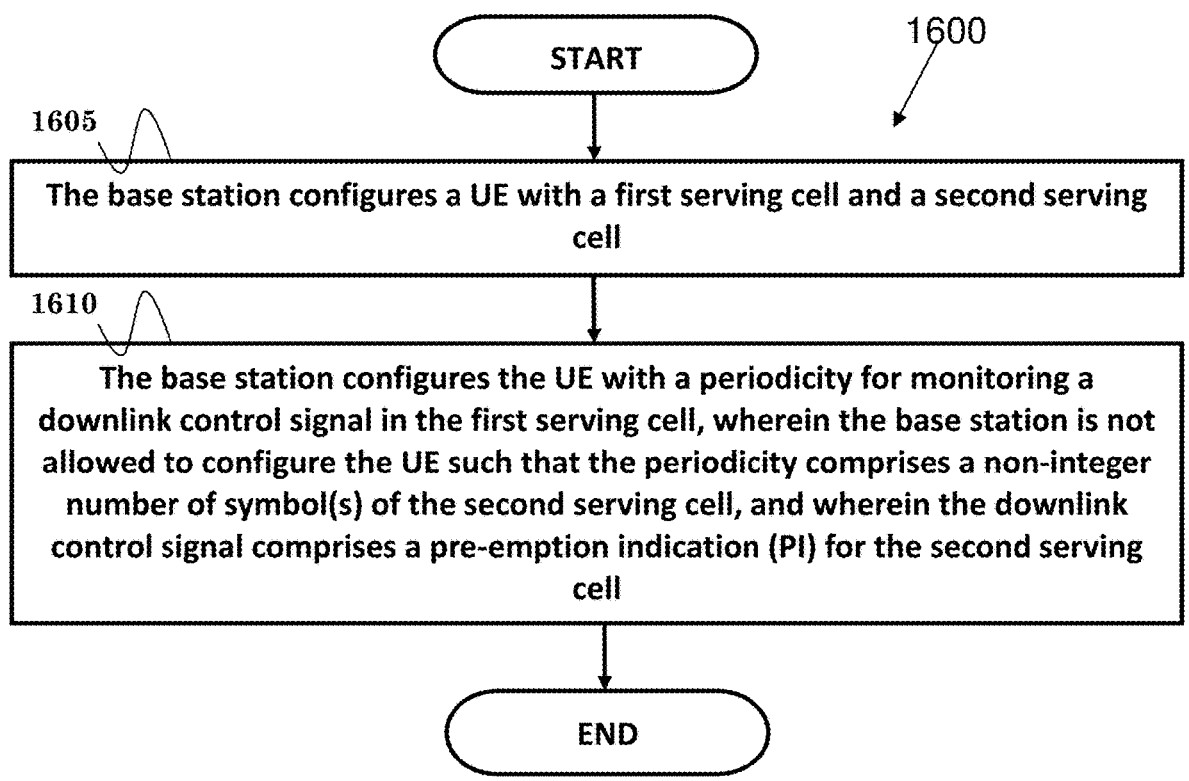
FIG. 16 is a flow chart according to one exemplary embodiment.

FIG. 16 is a flow chart 1600 according to one exemplary embodiment of a base station. In step 1605, the base station configures a UE with a first serving cell and a second serving cell. In step 1610, the base station configures the UE with a periodicity for monitoring a downlink control signal in the first serving cell, wherein the base station is not allowed to configure the UE such that the periodicity comprises a non-integer number of symbol(s) of the second serving cell, and wherein the downlink control signal comprises a pre-emption indication (PI) for the second serving cell.

In one embodiment, the number of symbols of the second serving cell within the periodicity could depend on a subcarrier spacing (SCS) of activated bandwidth part (BWP) of the second serving cell.

In one embodiment, if the first serving cell is configured with 60 KHz subcarrier spacing and the second serving cell is configured with 15 KHz subcarrier spacing, the base station could configure the UE with a periodicity as 2 slots or 4 slots for receiving the DCI in the first serving cell. Furthermore or alternatively, if the first serving cell is configured with 60 KHz subcarrier spacing and the second serving cell is configured with 15 KHz subcarrier spacing, the base station may not configure the UE a periodicity with 1 slot for receiving the DCI in the first serving cell.

In one embodiment, when the base station configures the UE a periodicity for receiving DCI in the first serving cell, the base station jointly determines the periodicity and the first serving cell, such that an integer number of symbol(s) of the second serving cell are within the periodicity. In addition or alternatively, when the base station configures the UE a periodicity for receiving DCI in the first serving cell, the base station could jointly determine the periodicity and subcarrier spacing(s) that is configured for the first serving cell and the second serving cell, such that an integer number of symbol(s) of the second serving cell are within the periodicity. Furthermore or alternatively, when the base station configures the UE a periodicity for receiving DCI in the first serving cell, the base station jointly determines the periodicity and whether to configure the UE to monitor two PIs in one serving cell.

In one embodiment, the downlink control signal could include a PI for the first serving cell.

Referring back to FIGS. 3 and 4, in one exemplary embodiment of a base station, the device 300 includes a program code 312 stored in the memory 310. The CPU 308 could execute program code 312 to enable the base station (i) to configure a UE with a first serving cell and a second serving cell, and (ii) to configure the UE with a periodicity for monitoring a downlink control signal in the first serving cell, wherein the base station is not allowed to configure the UE such that the periodicity comprises a non-integer number of symbol(s) of the second serving cell, and wherein the downlink control signal comprises a pre-emption indication (PI) for the second serving cell. Furthermore, the CPU 308 can execute the program code 312 to perform all of the above-described actions and steps or others described herein.

Figure 17:
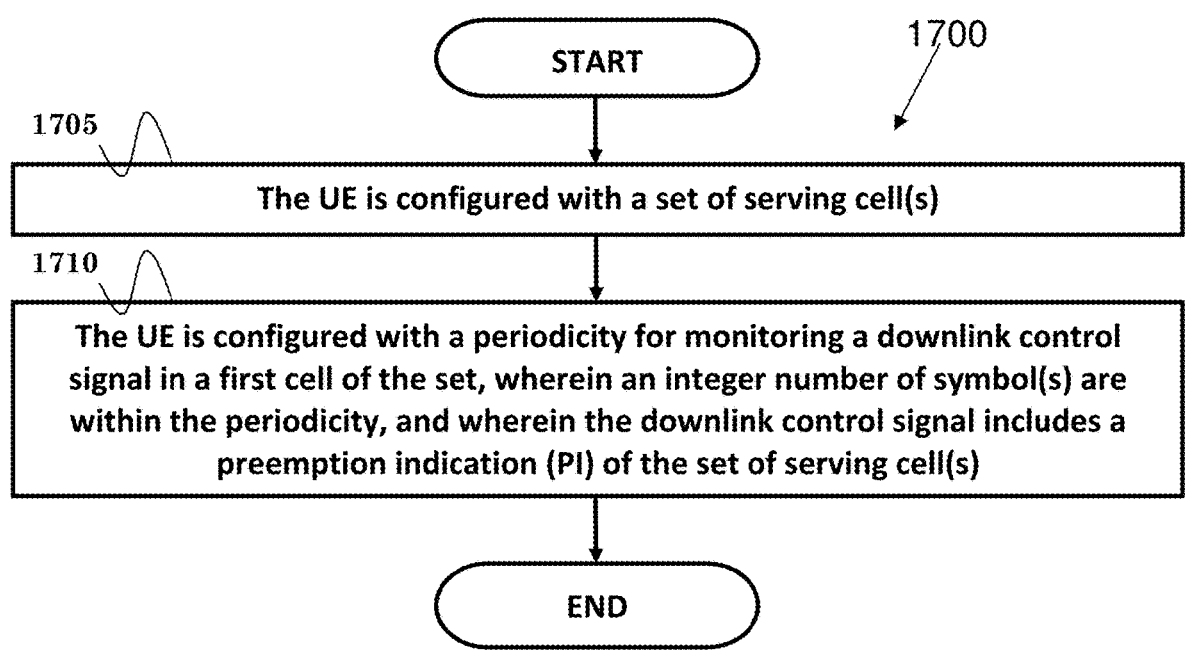
FIG. 17 is a flow chart according to one exemplary embodiment.

FIG. 17 is a flow chart 1700 according to one exemplary embodiment of a UE. In step 1705, the UE is configured with a set of serving cell(s). In step 1710, the UE is configured with a periodicity for monitoring a downlink control signal in a first cell of the set, wherein an integer number of symbol(s) are within the periodicity, and wherein the downlink control signal includes a preemption indication (PI) of the set of serving cell(s).

Referring back to FIGS. 3 and 4, in one exemplary embodiment of a UE, the device 300 includes a program code 312 stored in the memory 310. The CPU 308 could execute program code 312 to enable the UE (i) to be configured with a set of serving cell(s), and (ii) to be configured with a periodicity for monitoring a downlink control signal in a first cell of the set, wherein an integer number of symbol(s) are within the periodicity, and wherein the downlink control signal includes a preemption indication (PI) of the set of serving cell(s). Furthermore, the CPU 308 can execute the program code 312 to perform all of the above-described actions and steps or others described herein.

Figure 18:
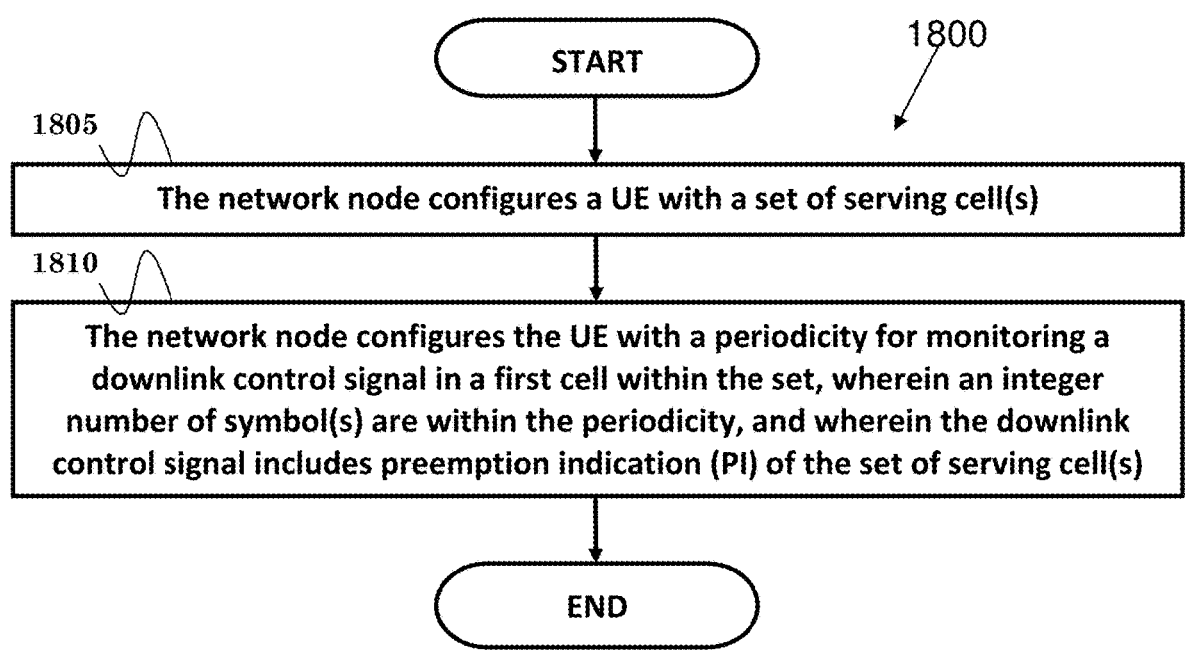
FIG. 18 is a flow chart according to one exemplary embodiment.

FIG. 18 is a flow chart 1800 according to one exemplary embodiment of a network node. In step 1805, the network node configures a UE with a set of serving cell(s). In step 1810, the network node configures the UE with a periodicity for monitoring a downlink control signal in a first cell within the set, wherein an integer number of symbol(s) are within the periodicity, and wherein the downlink control signal includes preemption indication (PI) of the set of serving cell(s).

Referring back to FIGS. 3 and 4, in one exemplary embodiment of a network node, the device 300 includes a program code 312 stored in the memory 310. The CPU 308 could execute program code 312 to enable the network node (i) to configure a UE with a set of serving cell(s), and (ii) to configure the UE with a periodicity for monitoring a downlink control signal in a first cell within the set, wherein an integer number of symbol(s) are within the periodicity, and wherein the downlink control signal includes preemption indication (PI) of the set of serving cell(s). Furthermore, the CPU 308 can execute the program code 312 to perform all of the above-described actions and steps or others described herein.

In the context of the embodiments shown in FIGS. 17 and 18 and described in the text above, in one embodiment, the UE may not be expected to handle that part of a symbol is within the periodicity. The network node may not be allowed to configure the UE such that the periodicity comprises a non-integer number of symbol(s). Furthermore or alternatively, the UE could be configured with at least one downlink bandwidth part in a cell of the set. In addition or alternatively, the UE could receive a downlink signal in a downlink BWP in a cell of the set according to a configured subcarrier spacing and a cyclic prefix (CP) length for the downlink BWP.

In one embodiment, a symbol duration in a downlink BWP of a cell is determined based on a configured subcarrier spacing and a cyclic prefix length for the downlink BWP. In addition or alternatively, one PI could have 14 bits. Furthermore or alternatively, the periodicity can be 1 or 2 or 4 slot, where the time duration of a slot depends on SCS and/or CP length of a downlink BWP in the first cell.

In one embodiment, a slot with a normal cyclic prefix could have 14 symbols. A slot with extended cyclic prefix could have 12 symbols.

In one embodiment, the first serving cell could have a downlink BWP with larger SCS.

Figure 19:
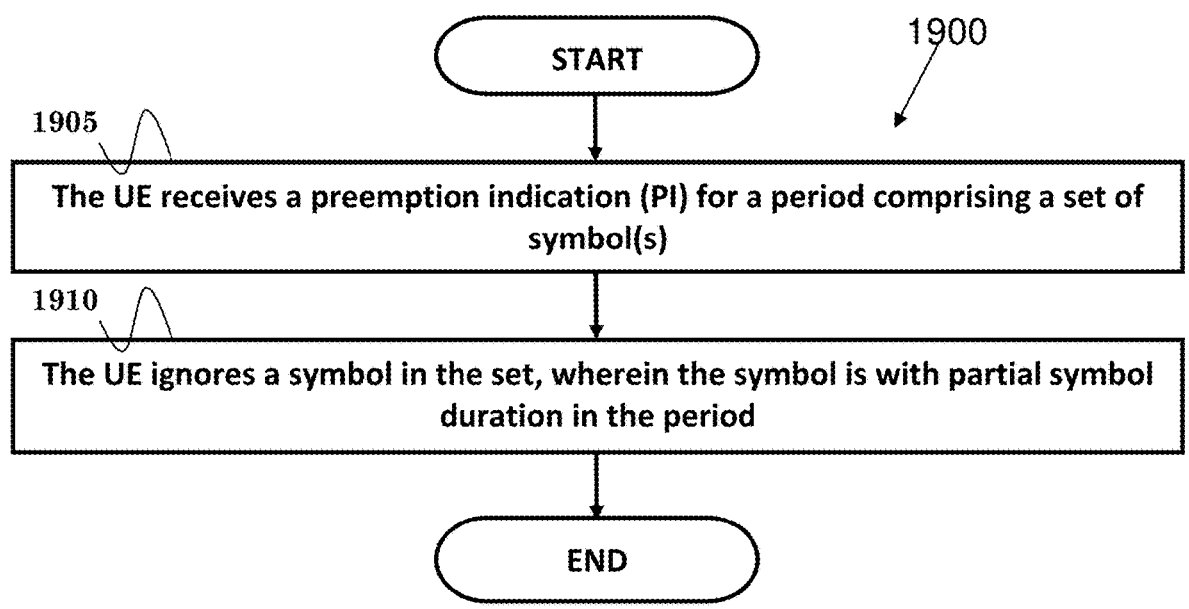
FIG. 19 is a flow chart according to one exemplary embodiment.

FIG. 19 is a flow chart 1900 according to one exemplary embodiment of a UE. In step 1905, the UE receives a preemption indication (PI) for a period comprising a set of symbol(s). In one embodiment, the period could be a monitoring periodicity of a downlink control information.

In step 1910, the UE ignores a symbol in the set of symbol(s), wherein the symbol is with partial symbol duration in the period. In one embodiment, the UE could be configured with a set of serving cell(s), wherein the PI is for one serving cell in the set of serving cell(s). The PI could be transmitted in the downlink control information. Furthermore or alternatively, the period could be configured as 1, 2, or 4 slot(s) to the UE.

In one embodiment, the UE could monitor the downlink control information in the first cell in every period. A subcarrier spacing (SCS) of an activated bandwidth part in the first cell is 60 kHz. If the UE monitors the downlink control information in the first cell every 1 slot with SCS 60 kHz, the period comprises 3.5 symbols when the SCS of an activated BWP in a second serving cell is 15 kHz, wherein the PI could be applied to the second serving cell.

In one embodiment, the UE could be configured to receive the downlink control information in a first cell of the set of serving cells. The downlink control information could include at least one PI(s) for the set of serving cell(s). Furthermore or alternatively, the downlink control information could be DCI format 2_1.

Referring back to FIGS. 3 and 4, in one exemplary embodiment of a UE, the device 300 includes a program code 312 stored in the memory 310. The CPU 308 could execute program code 312 to enable the UE (i) to receive a preemption indication (PI) for a period comprising a set of symbol(s), and (ii) to ignores a symbol in the set, wherein the symbol is with partial symbol duration in the period. Furthermore, the CPU 308 can execute the program code 312 to perform all of the above-described actions and steps or others described herein.

Figure 20:
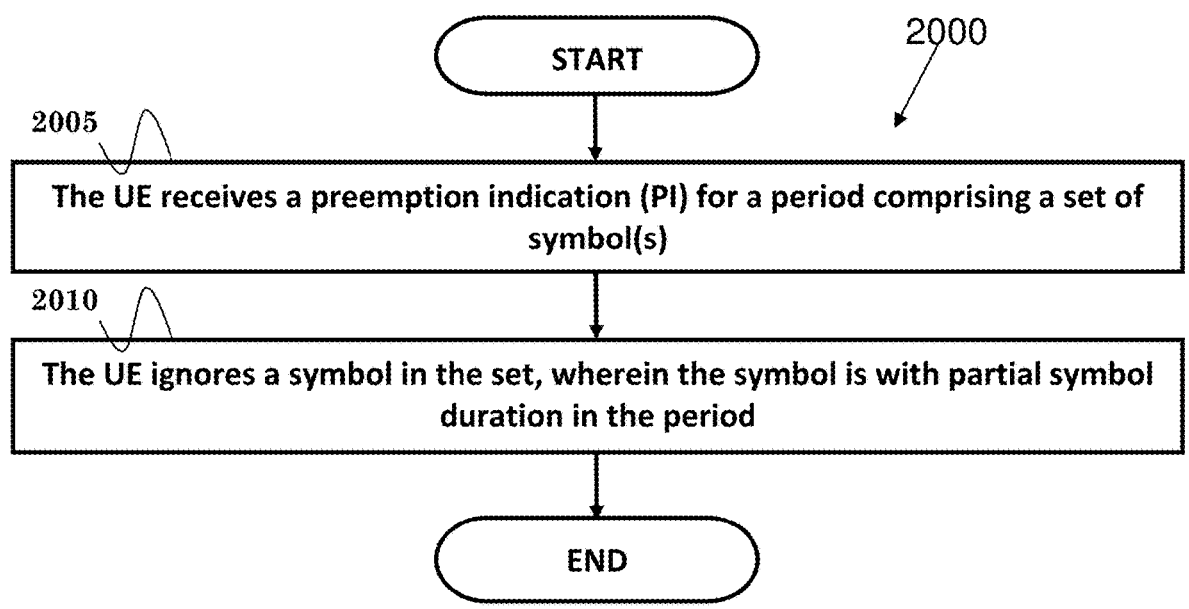
FIG. 20 is a flow chart according to one exemplary embodiment.

FIG. 20 is a flow chart 2000 according to one exemplary embodiment of a UE. In step 2005, the UE receives a preemption indication (PI) for a period comprising a set of symbol(s). In step 2010, the UE ignores a symbol in the set of symbol(s) if the symbol is the last symbol in the period; wherein the symbol is with partial symbol duration in the period.

In one embodiment, if the symbol is the last symbol in the period, the UE could add the symbol in the set of symbol(s). Furthermore, the UE could be configured with a set of serving cell(s); wherein the PI is for one serving cell in the set of serving cell(s). The PI is transmitted in a downlink control information.

In one embodiment, the UE could be configured to receive the downlink control information in a first cell of the set of serving cells. The downlink control information could include at least one PI(s) for the set of serving cell(s). The downlink control information could also be DCI format 2_1.

In one embodiment, the period could be a monitoring periodicity of the downlink control information. Furthermore, the period could be configured as 1, 2, or 4 slot(s) to the UE.

In one embodiment, the UE could monitor the downlink control information in the first cell in every period. Furthermore, a SCS of a BWP in the first cell could be 60 kHz. If the UE monitors the downlink control information in the first cell every 1 slot with SCS 60 kHz, the period could include 3.5 symbols when a SCS of an activated BWP in a second serving cell is 15 kHz, wherein the PI is applied to the second serving cell.

Referring back to FIGS. 3 and 4, in one exemplary embodiment of a UE, the device 300 includes a program code 312 stored in the memory 310. The CPU 308 could execute program code 312 to enable the UE (i) to receive a preemption indication (PI) for a period comprising a set of symbol(s), and (ii) to ignores a symbol in the set if the symbol is the last symbol in the period; wherein the symbol is with partial symbol duration in the period. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), comprising:
the UE receives a configuration that the UE communicates with a first serving cell in a first subcarrier spacing (SCS) and communicates with a second serving cell in a second subcarrier spacing (SCS), wherein value of the first SCS is different from value of the second SCS; and wherein the UE receives a first data transmission in the first serving cell and the UE receives a second data transmission in the second serving cell; and
the UE receives a configuration of a periodicity for monitoring a downlink control signal in the first serving cell, wherein the periodicity is in unit of a slot with the first SCS and includes an integer number of symbol(s) of the second serving cell, and wherein a symbol duration of a symbol of the second serving cell is derived from the second SCS, and wherein the downlink control signal includes a first pre-emption indication (PI) for the first serving cell and a second PI for the second serving cell, and wherein the UE uses the integer number of symbol(s) to interpret the second PI when a candidate value for the periodicity for monitoring corresponds to non-integer number of symbol(s) of the second serving cell.

2. The method of claim 1, wherein the UE does not expect to receive a configuration such that the periodicity includes a non-integer number of symbol(s) of the second serving cell.

3. The method of claim 1, wherein the number of symbols of the second serving cell is a number of symbol(s) indicated by the second PI for the second serving cell.

4. The method of claim 1, wherein the number of symbols of the second serving cell within the periodicity depends on the second SCS.

5. The method of claim 1, wherein when the first SCS is 60 kHz and the second SCS is 15 kHz, the UE is configured by a base station with a periodicity as 2 slots or 4 slots for receiving the DCI in the first serving cell.

6. The method of claim 1, wherein when the first SCS is 60 kHz and the second SCS is 15 kHz, the UE is not expected to receive a configuration of a periodicity with 1 slot for receiving the DCI in the first serving cell.

7. The method of claim 1, wherein the second PI is used to inform the UE about no transmission for the UE in physical resource blocks (PRBs) and in symbols of the second serving cell from the periodicity for decoding the second data transmission.

8. The method of claim 1, wherein the second PI indicates no transmission in physical resource blocks (PRBs) and in symbols of the second serving cell among the periodicity by a bit-map.

9. The method of claim 1, wherein a bit value of 1 indicated in the bit-map indicates no transmission in associated physical resource blocks (PRBs) and in associated symbols of the second serving cell among the periodicity.

10. A method of a base station, comprising:
the base station configures a UE with a first serving cell and a second serving cell, wherein the base station communicates with the UE in the first serving cell in a first subcarrier spacing (SCS) and communicates with a second serving cell in a second subcarrier spacing (SCS), and wherein value of the first SCS is different from the value of the second SCS; and wherein the base station transmits a first data to the UE in the first serving cell and transmits a second data to the UE in the second serving cell;
the base station configures the UE with a periodicity for monitoring a downlink control signal in the first serving cell,
wherein the periodicity is in unit of a slot with the first SCS, and
wherein the base station is not allowed to configure the UE such that the periodicity comprises a non-integer number of symbol(s) of the second serving cell, and wherein a symbol duration of a symbol of the second serving cell is derived from the second SCS, and wherein the downlink control signal comprises a first pre-emption indication (PI) for the first serving cell and a second PI for the second serving cell, and
wherein the second PI is interpreted with the integer number of symbol(s) when a candidate value for the periodicity for monitoring corresponds to non-integer number of symbol(s) of the second serving cell.

11. The method of claim 10, wherein the number of symbols of the second serving cell within the periodicity depends on the second SCS.

12. The method of claim 10, wherein when the first SCS is 60 kHz and the second SCS is 15 kHz, the base station configures the UE with a periodicity as 2 slots or 4 slots for receiving the DCI in the first serving cell.

13. The method of claim 10, wherein when the first SCS is 60 kHz and the second SCS is 15 kHz, the base station does not configure the UE a periodicity with 1 slot for receiving the DCI in the first serving cell.

14. The method of claim 10, wherein when the base station configures the UE a periodicity for receiving DCI (Downlink Control Information) in the first serving cell, the base station jointly determines the periodicity and the first serving cell, such that an integer number of symbol(s) of the second serving cell are within the periodicity.

15. The method of claim 10, wherein when the base station configures the UE a periodicity for receiving DCI (Downlink Control Information) in the first serving cell, the base station jointly determines the periodicity and subcarrier spacing(s) that is configured for the first serving cell and the second serving cell, such that an integer number of symbol(s) of the second serving cell are within the periodicity.

16. The method of claim 10, wherein when the base station configures the UE a periodicity for receiving DCI (Downlink Control Information) in the first serving cell, the base station jointly determines the periodicity and whether to configure the UE to monitor two PIs in one serving cell.

17. The base station of claim 10, wherein the base station transmits the downlink control signal indicating the second PI for the second serving cell, wherein the second PI for the second serving cell indicates a portion of the second data which the base station does not transmit to the UE in the second serving cell.

18. The base station of claim 10, wherein the second PI indicates no transmission in physical resource blocks (PRBs) and in symbols of the second serving cell among the periodicity by a bit-map.

19. The base station of claim 10, wherein a bit value of 1 indicated in the bit-map indicates no transmission in associated physical resource blocks (PRBs) and in associated symbols of the second serving cell among periodicity.

20. A base station, comprising:
a control circuit;
a processor installed in the control circuit;
a memory installed in the control circuit and coupled to the processor;
wherein the processor is configured to execute a program code stored in the memory to:
configure a UE with a first serving cell and a second serving cell, wherein the base station communicates with the UE in the first serving cell in a first subcarrier spacing (SCS) and communicates with a second serving cell is a second subcarrier spacing (SCS), and wherein value of the first SCS is different from value of the second SCS, and wherein the base station transmits a first data to the UE in the first serving cell and transmits a second data to the UE in the second serving cell; and
configure the UE with a periodicity for monitoring a downlink control signal in the first serving cell, wherein the periodicity is in unit of a slot with the first SCS, and
wherein the base station is not allowed to configure the UE such that the periodicity comprises a non-integer number of symbol(s) of the second serving cell, and wherein a symbol duration of a symbol of the second serving cell is derived from the second SCS, and wherein the downlink control signal comprises a first pre-emption indication (PI) for the first serving cell and a second PI for the second serving cell, and wherein the second PI is interpreted with an integer number of symbol(s) when a candidate value for the periodicity for monitoring corresponds to non-integer number of symbol(s) of the second serving cell.

21. The base station of claim 20, wherein the number of symbols of the second serving cell within the periodicity depends on the second SCS.

22. The base station of claim 20, wherein when the first SCS is 60 kHz and the second SCS is 15 kHz, the base station configures the UE with a periodicity as 2 slots or 4 slots for receiving the DCI in the first serving cell.

23. The base station of claim 20, wherein when the first SCS is 60 kHz and the second SCS is 15 kHz, the base station does not configure the UE a periodicity with 1 slot for receiving the DCI in the first serving cell.

24. The base station of claim 20, wherein when the base station configures the UE a periodicity for receiving DCI (Downlink Control Information) in the first serving cell, the base station jointly determines the periodicity and subcarrier spacing(s) that is configured for the first serving cell and the second serving cell, such that an integer number of symbol(s) of the second serving cell are within the periodicity.

* * * * *